United States Patent
Bond et al.

(10) Patent No.: US 11,720,167 B2
(45) Date of Patent: *Aug. 8, 2023

(54) ARTIFICIAL REALITY TRIGGERED BY PHYSICAL OBJECT

(71) Applicant: Meta Platforms Technologies, LLC, Menlo Park, CA (US)

(72) Inventors: Lars Anders Bond, San Mateo, CA (US); Christopher John Ocampo, Dublin, CA (US); Stefano Zanetti, Redwood City, CA (US)

(73) Assignee: META PLATFORMS TECHNOLOGIES, LLC, Menlo Park, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/659,431

(22) Filed: Apr. 15, 2022

(65) Prior Publication Data
US 2022/0236791 A1 Jul. 28, 2022

Related U.S. Application Data

(63) Continuation of application No. 16/567,563, filed on Sep. 11, 2019, now Pat. No. 11,307,647.

(51) Int. Cl.
*G06F 3/01* (2006.01)
*G06T 11/00* (2006.01)

(52) U.S. Cl.
CPC .............. *G06F 3/011* (2013.01); *G06F 3/017* (2013.01); *G06T 11/00* (2013.01)

(58) Field of Classification Search
None
See application file for complete search history.

(56) References Cited

U.S. PATENT DOCUMENTS

| 10,335,572 | B1 | 7/2019 | Kumar |
| 11,307,647 | B2* | 4/2022 | Bond ................ G06F 3/011 |
| 2013/0336629 | A1 | 12/2013 | Mulholland et al. |
| 2016/0260261 | A1 | 9/2016 | Hsu |
| 2018/0189568 | A1 | 7/2018 | Powderly et al. |

(Continued)

OTHER PUBLICATIONS

International Preliminary Report on Patentability for International Application No. PCT/US2020/045538, dated Mar. 24, 2022, 9 pages.

(Continued)

*Primary Examiner* — Brian M Butcher
(74) *Attorney, Agent, or Firm* — Shumaker & Sieffert, P.A.

(57) ABSTRACT

This disclosure describes an artificial reality system that presents artificial reality content or artificial reality effects based on, or in response to, interactions with one or more physical objects within a physical environment. In one example, this disclosure describes a method that includes determining that a user has performed a trigger action on a trigger object; responsive to determining that the user has performed the trigger action, generating artificial reality content; presenting the artificial reality content on a display associated with a head-mounted display; determining that the user has performed a de-trigger action; and responsive to determining that the user has performed the de-trigger action, discontinuing presentation of the artificial reality content.

18 Claims, 13 Drawing Sheets

(56) References Cited

U.S. PATENT DOCUMENTS

| | | |
|---|---|---|
| 2019/0096131 A1 | 3/2019 | Crews et al. |
| 2020/0042108 A1 | 2/2020 | Wan |
| 2020/0334908 A1 | 10/2020 | Wilson et al. |
| 2020/0368616 A1 | 11/2020 | Delamont |
| 2020/0394935 A1 | 12/2020 | Ray et al. |
| 2020/0402320 A1 | 12/2020 | Crews et al. |

OTHER PUBLICATIONS

International Search Report and Written Opinion for International Application No. PCT/US2020/045538, dated Oct. 23, 2020, 11 Pages.

Prosecution history of U.S. Appl. No. 16/567,563 dated Jan. 25, 2021 through Dec. 21, 2021, 52 pp.

* cited by examiner

ARTIFICIAL REALITY TRIGGERED BY PHYSICAL OBJECT

CROSS REFERENCE

This application is a continuation application of and claims priority to U.S. patent application Ser. No. 16/567,563 filed on Sep. 11, 2019, which is hereby incorporated by reference herein in its entirety.

TECHNICAL FIELD

This disclosure generally relates to artificial reality systems, such as virtual reality, mixed reality and/or augmented reality systems, and more particularly, to presentation of content and performing operations in artificial reality applications.

BACKGROUND

Artificial reality systems are becoming increasingly ubiquitous with applications in many fields such as computer gaming, health and safety, industrial, and education. As a few examples, artificial reality systems are being incorporated into mobile devices, gaming consoles, personal computers, movie theaters, and theme parks. In general, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof.

Typical artificial reality systems include one or more devices for rendering and displaying content to users. As one example, an artificial reality system may incorporate a head-mounted display (HMD) worn by a user and configured to output artificial reality content to the user. The artificial reality content may include a number of different types of artificial reality content, including see-through AR, overlay AR, completely-generated content, generated content combined with captured content (e.g., real-world video and/or images), or other types. During operation, the user typically interacts with the artificial reality system to select content, launch applications or otherwise configure the system.

SUMMARY

This disclosure describes an artificial reality system that presents artificial reality content or artificial reality effects based on, or in response to, interactions with one or more physical objects within a physical environment. Techniques described herein include detecting one or more interactions (e.g., a "triggering action" or "trigger action") performed with respect to a specific object (i.e., a "trigger object"). Upon detecting the trigger action, an artificial reality system may create and/or present various artificial reality content or effects. In some examples, such artificial reality content or effects may include starting a game or a communication session, augmenting aspects of the user's physical environment with artificial reality content, or presenting an immersive artificial reality environment or virtual world. Techniques described herein further include ceasing presentation of such artificial reality content in response to another, subsequent interaction with the trigger object (e.g., a "de-trigger action").

In one specific example, a chair may serve as a trigger object, and in response to a user sitting on the chair, an artificial reality system may present specific artificial reality content. In such an example, the artificial reality system may later detect that the user is no longer sitting in the chair and is standing. In response, the artificial reality system may cease presentation of the artificial reality content and present an image of the physical environment (or, in other examples, present different artificial reality content).

In some examples, this disclosure describes operations performed by an artificial reality system in accordance with one or more aspects of this disclosure. In one specific example, this disclosure describes a method comprising determining that a user has performed a trigger action with respect to a trigger object, and responsive to determining that the user has performed the trigger action, presenting artificial reality content.

In another example, this disclosure describes a system comprising an image capture system configured to capture image data representative of a physical environment having a plurality of physical objects including a trigger object, the trigger object being capable of supporting a user in a sitting position; a head-mounted display (HMD) worn by the user; a mapping engine configured to determine, based on the image data, a map of the physical environment including the trigger object; and an application engine configured to: determine that the user has sat down on the trigger object, and responsive to determining that the user has sat down on the trigger object, present an artificial reality environment on a display associated with the HMD.

In another example, this disclosure describes a method comprising capturing, by an artificial reality system, image data representative of a physical environment having a plurality of physical objects including a trigger object, the trigger object being capable of supporting a user in a sitting position; determining, by the artificial reality system and based on the image data, a map of the physical environment including position information about the trigger object; determining, by the artificial reality system, that the user is performing a sitting motion on the trigger object, and responsive to determining that the user is performing a sitting motion on the trigger object, presenting, by the artificial reality system, an artificial reality environment on a display associated with a head-mounted display (HMD).

In another example, this disclosure describes a non-transitory computer-readable medium comprising instructions for causing processing circuitry of an artificial reality system to perform operations comprising: capturing image data representative of a physical environment having a plurality of physical objects including a trigger object, the trigger object being capable of supporting a user in a sitting position; determining, based on the image data, a map of the physical environment including position information about the trigger object; determining that the user is performing a sitting motion on the trigger object, and responsive to determining that the user is performing a sitting motion on the trigger object, presenting an artificial reality environment on a display associated with a head-mounted display.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1A:
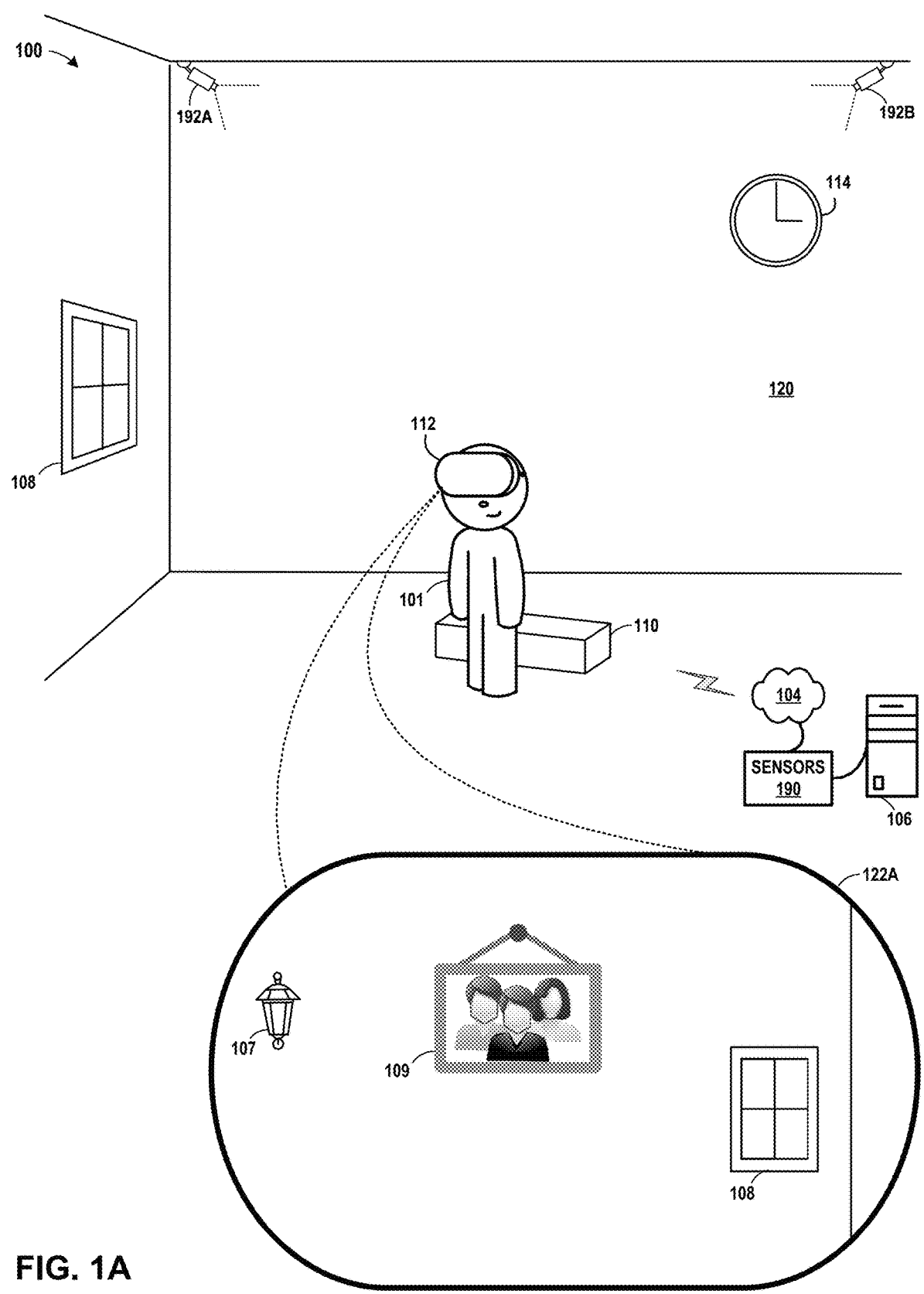
FIG. 1A is a conceptual diagram illustrating an example artificial reality system that generates artificial reality content, in accordance with one or more aspects of the present disclosure.

FIG. 1A, FIG. 1B, FIG. 1C, and FIG. 1D are a sequence of conceptual diagrams illustrating operations performed by an example artificial reality system, in accordance with one or more aspects of the present disclosure. In each of FIG. 1A, FIG. 1B, and FIG. 1C, artificial reality system 100 is depicted within or operating on physical environment 120. Physical environment 120 is shown as a room that includes user 101 and a number of real world or physical objects, including HMD 112, window 108, seat 110, and wall clock 114. Other physical objects, such as lamp 107 and picture 109, are included within physical environment 120 but are not specifically illustrated with physical environment 120 in FIG. 1A. Images of lamp 107 and picture 109 are, however, illustrated within artificial reality content 122A of FIG. 1A, for example.

Artificial reality system 100 includes head-mounted display (HMD) 112, console 106, one or more sensors 190, and cameras 192A and 192B (collectively "cameras 192," representing any number of cameras). Although in some examples, external sensors 190 and cameras 192 may be stationary devices (e.g., affixed to the wall), in other examples one or more of external sensors 190 and/or cameras 192 may be included within HMD 112, within a user device (not shown), or within any other device or system. As shown in each of FIG. 1A, FIG. 1B, FIG. 1C, and FIG. 1D, HMD 112 is typically worn by user 101 and includes an electronic display and optical assembly for presenting artificial reality content 122A to the user. In addition, HMD 112 may, in some examples, include one or more sensors (e.g., accelerometers) for tracking motion of the HMD and may include one or more image capture devices, e.g., cameras, line scanners and the like, for capturing image data of the surrounding environment.

Artificial reality system 100 may use information obtained from a real-world or physical three-dimensional (3D) environment to render artificial reality content for display by HMD 112, thereby presenting the content to user 101. In each of the examples illustrated in FIG. 1A, FIG. 1B, FIG. 1C, and FIG. 1D, user 101 views and/or is presented with artificial reality content constructed and rendered by an artificial reality application executing on console 106 and/or HMD 112. In the example of FIG. 1A, user 101 is presented with and/or view the artificial reality content 122A. Similarly, in FIG. 1B, user 101 views artificial reality content 122B, in FIG. 1C, user 101 views artificial reality content 122C, and in FIG. 1D, user 101 views artificial reality content 122D. In each case, the artificial reality content may include images of physical objects within physical environment 120, including lamp 107, window 108, and picture 109 (see artificial reality content 122A and 122D) or in other situations, the artificial reality content might include few or no images of physical objects (e.g., artificial reality content 122B and 122C).

Some physical objects, as further described herein, may be special objects or "trigger objects." A trigger object may be an object that, when certain interactions are performed with respect to such an object, artificial reality system 100 performs one or more specific or special operations. For instance, in some examples, seat 110 might serve as a trigger object. In such an example, when artificial reality system 100 determines that user 101 has performed a movement that results in user 101 sitting on seat 110, artificial reality system 100 may determine that the movement qualifies as a trigger action. As another example, when artificial reality system 110 determines that user 101 is seated on seat 110, artificial reality system 100 may determine that the user has performed a movement that qualifies as a trigger action. Artificial reality system 100 may, in response to the trigger action, perform one or more specific operations, which may include presentation of specific artificial realty content within HMD 112 worn by user 101.

In each of the illustrations of FIG. 1A, FIG. 1B, FIG. 1C, and FIG. 1D, console 106 is shown as a single computing device, such as a gaming console, workstation, a desktop computer, or a laptop. In other examples, console 106 may be distributed across a plurality of computing devices, such as a distributed computing network, a data center, or a cloud computing system. HMD 112, console 106, external sensors 190, and cameras 192, may, as illustrated, be communicatively coupled via network 104, which may be a wired or wireless network, such as Wi-Fi, a mesh network or a short-range wireless communication medium. In some examples, user 101 may use one or more controllers (not shown) to perform gestures or other actions. In such an example, such controllers may be in communication with HMD 112 using near-field communication or short-range wireless communication such as Bluetooth, using wired communication links, or using another type of communication links. Although HMD 112 is shown in each of FIG. 1A, FIG. 1B, FIG. 1C, and FIG. 1D as being in communication with (e.g., tethered to) or in wireless communication with, console 106, in some implementations HMD 112 operates as a stand-alone, mobile artificial reality system. As such, some or all functionality attributed to console 106 in this disclosure may be distributed among one or more user devices, such as one or more instances of HMD 112.

In some examples, an artificial reality application executing on console 106 and/or HMD 112 presents artificial reality content to user 101 based on a current viewing perspective for user 101. That is, in FIG. 1A for example, the artificial reality application constructs artificial content by tracking and computing pose information for a frame of reference for HMD 112, and uses data received from HMD 112, external sensors 190, and/or cameras 192 to capture 3D information within the real-word, physical 3D environment 120, such as motion by user 101 and/or tracking information with respect to user 101 and one or more physical objects, for use in computing updated pose information for a corresponding frame of reference of HMDs 112 (or another user device). As one example, the artificial reality application may render, based on a current viewing perspective determined for HMD 112, an artificial reality environment, including artificial reality content 122A having, in some cases, artificial reality content overlaid upon images of physical or real-world objects (e.g., window 108). Further, from the perspective of HMD 112, artificial reality system 100 renders artificial reality content based upon the estimated positions and poses for user 101 and other physical objects.

In the example of FIG. 1A, an in accordance with one or more aspects of the present disclosure, artificial reality system 100 may present an artificial reality environment including content 122A within HMD 112. For instance, in an example that can be described with reference to FIG. 1A, HMD 112, external sensors 190, and/or cameras 192 capture images within physical environment 120. HMD 112 detects information about a current pose of user 101. Console 106 receives such images and information about the current pose of user 101 and determines the position of physical objects within physical environment 120, including user 101 and seat 110. Console 106 determines, based on the position of physical objects within physical environment 120 and the pose information, that user 101 is standing within physical environment 120 near seat 110. Based on the position information and pose information, console 106 generates artificial reality content 122A. Console 106 causes HMD 112 to present artificial reality content 122A to user 101 within HMD 112 in the manner shown in FIG. 1A.

Figure 1B:
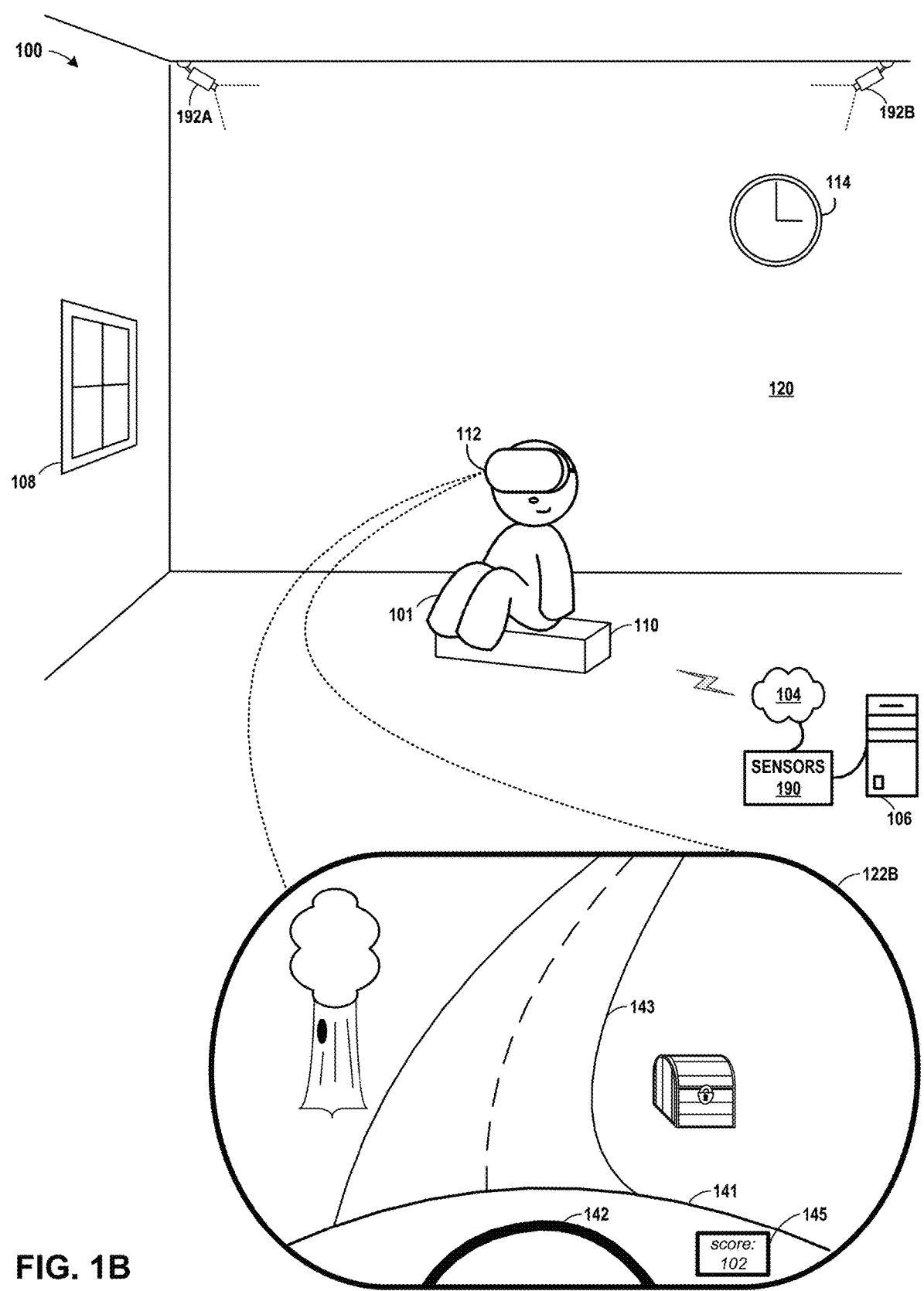
FIG. 1B is a conceptual diagram illustrating an example artificial reality system that generates artificial reality content in response to one or more interactions with an object, in accordance with one or more aspects of the present disclosure.

Artificial reality system 100 may detect that user 101 has performed a trigger action, and in response, present artificial reality content 122B. For instance, continuing with the example and referring now to FIG. 1B, HMD 112, external sensors 190, and/or cameras 192 capture images within physical environment 120, and HMD 112 captures information about a current pose of user 101. Console 106 receives the images and pose information and determines that user 101 has moved so that user 101 is sitting on seat 110 as illustrated in FIG. 1B. Console 106 determines that the movement by user 101 corresponds to a trigger action. Responsive to the trigger action, console 106 generates artificial reality content 122B. Console 106 causes HMD 112 to present artificial reality content 122B to user 101 within HMD 112 in the manner shown in FIG. 1B.

In FIG. 1B, artificial reality content 122B includes content corresponding to a driving scene, such might be presented for an artificial reality driving game or artificial reality driving experience. Artificial reality content 122B includes virtual dashboard 141 and virtual steering wheel 142, which may correspond to objects included within an artificial reality car. A view from such an artificial reality car that is driving along virtual road 143 is illustrated within artificial reality content 122B. In some examples, virtual steering wheel 142 (or other aspects of artificial reality content 122B) might correspond to a physical object possessed by or near user 101, but in other examples, virtual steering wheel 142 might be simply a virtual steering wheel 142.

Artificial reality content 122B may be chosen by artificial reality system 100 based on a prior configuration indicating that each time user 101 sits on artificial reality system 100, a game or other artificial reality application corresponding to artificial reality content 122B may be presented. In such an example, sitting on seat 110 may have a consistent and known result, and user 101 may initiate the artificial reality experience associated with artificial reality content 122B by simply sitting on seat 110. In other examples, seat 110 may initiate another type of experience, such as a virtual movie theatre, a virtual safari, or a virtual world, or may initiate an application, such as a communication or video conferencing session. In some examples, sitting on seat 110 may cause or enable user 101 to answer a call or video call and enter or initiate teleconference or video conference. In some examples, the experience presented by artificial reality content 122 may be based on contextual information about user 101, such as information from a calendar maintained by user 101 (a teleconferencing session based on an appointment on the user's calendar, or during on a holiday celebrated by user 101, appropriate decorations might be included in artificial reality content 122B). In other examples, artificial reality content 122B may be based on prior activity by user 101 (each morning, user 101 initiates a call to a relative, or spends time reading in a specific artificial reality environment, or on weekends, user 101 often likes to visit his or her parents' home, or revisit an old memory). To identify the user, HMD 112 may use biometric information and/or input from user 101 (e.g., a username or password).

The artificial reality experience presented may also differ based on how the trigger action is performed. For instance, in some examples, sitting on seat 110 might initiate one type of artificial reality experience, while standing on seat 110, might initiate another. In another example, the artificial reality experience may be presented based on the condition of user 101, such as might be determined based on biometrics information. For instance, in one such example, a calming artificial reality experience (e.g., a visit to a childhood home) might be presented to user 101 when HMD 112 determines that user 101 exhibits signs of stress. Still further, artificial reality content 122B may be chosen based on one or more objects possessed or held in the hand of user 101 (e.g., a joystick or a steering wheel), as is further described in connection with FIG. 6.

Artificial reality system 100 may perform operations in response to interactions with a user interface. For instance, still continuing with the same example and with reference to FIG. 1C, HMD 112 detects movement and/or gestures performed by user 101. Console 106 receives information about the movements and/or gestures and determines that they correspond to a request to present a user interface. Console 106 generates artificial reality content 122C including user interface menu 124. Console 106 causes HMD 112 to present artificial reality content 122C to user 101 within HMD 112 in the manner shown in FIG. 1C. Console 106 may receive indications that user 101 has performed movements interacting with one or more user interface elements 126 of user interface menu 124. Console 106 may interpret such movements as commands to perform operations. In response, console 106 may perform operations to carry out such commands, which may include modifications to artificial reality content 122C, such as altering content presented within HMD 112 or altering configuration options for a game corresponding to the content presented within artificial reality content 122B and artificial reality content 122C.

Figure 1C:
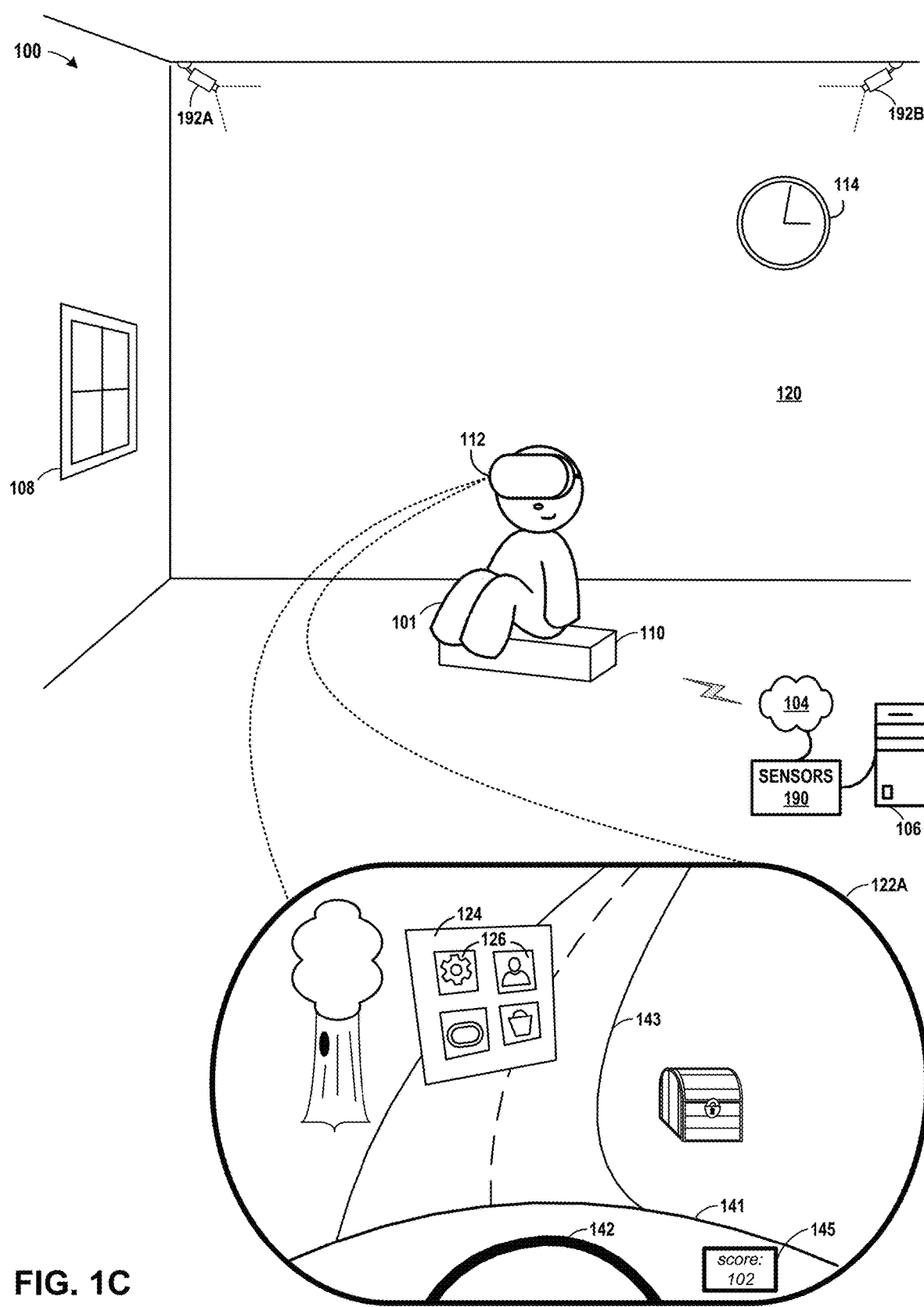
FIG. 1C is a conceptual diagram illustrating an example artificial reality system that generates a user interface menu when presenting artificial reality content, in accordance with one or more aspects of the present disclosure.
Figure 1D:
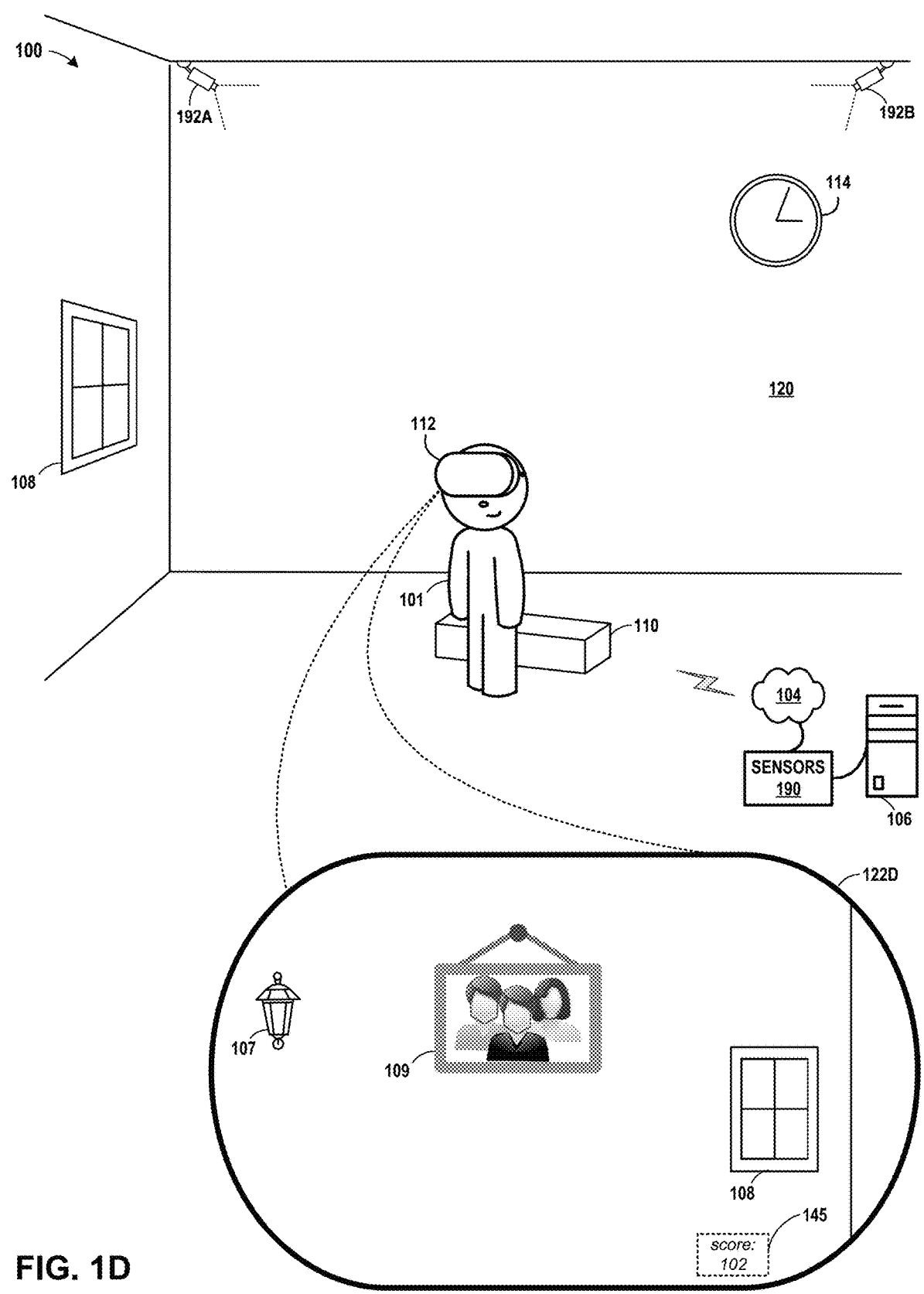
FIG. 1D is a conceptual diagram illustrating an example artificial reality system that ceases presentation of at least some aspects of artificial reality content in response to one or more actions performed by a user relative to an object, in accordance with one or more aspects of the present disclosure.

Artificial reality system 100 may determine that user 101 has performed a de-trigger action, and in response, cease presentation of artificial reality content 122C. For instance, still continuing with the example being described, and now with reference to FIG. 1C and FIG. 1D, HMD 112, external sensors 190, and/or cameras 192 capture images and pose information. Console 106 receives the images and pose information and determines that user 101 is standing near seat 110 and is no longer sitting on seat 110, as illustrated in FIG. 1D. Console 106 determines that movement by user 101 corresponds to a de-trigger action. Responsive to detecting the de-trigger action, console 106 generates artificial reality content 122D. In the example being described, the de-trigger action may be, in some respects, the opposite of the trigger action (i.e., standing after sitting in a chair may be considered the opposite of sitting in the chair). Console 106 causes HMD 112 to present artificial reality content 122D to user 101 within HMD 112 in the manner shown in FIG. 1D.

In FIG. 1D, artificial reality content 122D includes content similar to that presented in artificial reality content 122A of FIG. 1A. Specifically, artificial reality content 122D includes lamp 107, window 108, and picture 109, each of which are presented as images of physical objects from physical environment 120. Upon standing up, therefore, user 101 is presented with artificial reality content 122D, which is very similar to artificial reality content 122A of FIG. 1A. Accordingly, in the example illustrated in FIG. 1A through FIG. 1D, the effect of user 101 sitting on seat 110 (i.e., performing a trigger action) and then standing up after sitting on seat 110 (i.e., performing a de-trigger action) is that sitting on seat 110 activates a mode change, causing artificial reality content to be presented. Standing up after sitting on seat 110, however, also causes a mode change, such as causing presentation of that artificial reality content to cease (or pause, suspend, hold, or terminate).

In the example described, therefore, user 101 may use seat 110 to automatically trigger presentation of a known artificial reality experience simply by sitting on seat 110. Sitting on seat 110 may be an effective, intuitive, frictionless, and natural way to initiate an artificial reality experience, and user 101 may associate various physical objects (i.e., trigger objects) with various artificial reality experiences that are triggered by performing actions on such trigger objects.

Also, in the example described, after being presented with artificial reality content 122C (in FIG. 1C), user 101 may also escape, cease, pause, or otherwise exit that artificial reality experience simply by standing up after sitting on seat 110. This may also be an effective, intuitive, frictionless, and natural way to exit an artificial reality experience, providing user 101 with a known way to transition to a more reality-based or a different experience where, in some examples, little or no artificial realty content is presented.

In such examples, standing (or otherwise performing a "de-trigger" action) may transition user 101 to a "safe" state that does not involve an immersive or intensive artificial reality experience. Such a safe state might be considered an "idle" state where idle artificial reality content is presented, which might involve primarily images of the physical world with little or no artificial reality content. In other examples, however, such an "idle" state may involve substantial artificial reality content overlaid on physical elements or even an immersive artificial reality experience.

Figure 2:
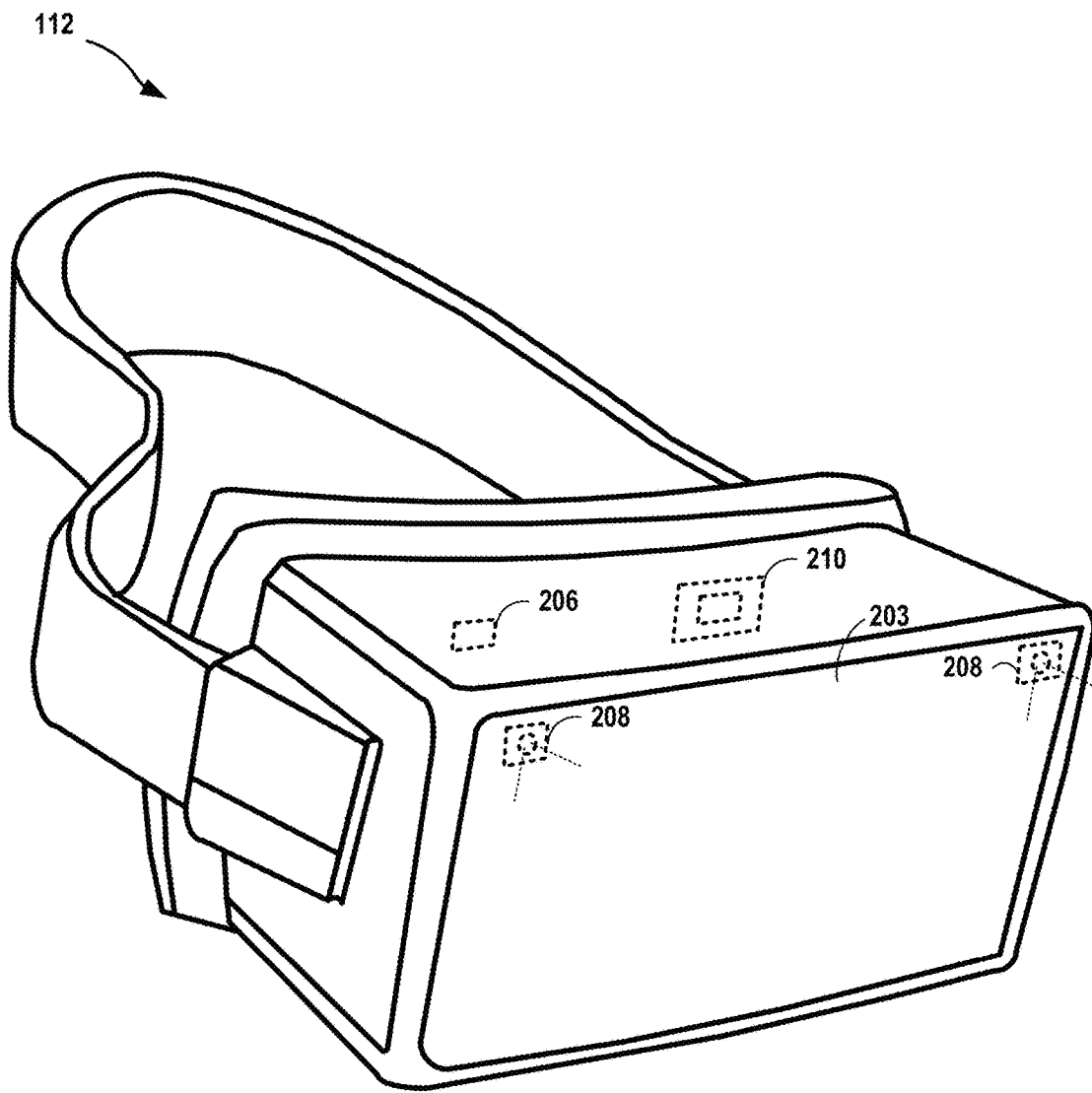
FIG. 2 is an illustration depicting an example head-mounted display configured to operate in accordance with the techniques of the disclosure.

FIG. 2 is an illustration depicting an example HMD 112 configured to operate in accordance with the techniques of the disclosure. HMD 112 of FIG. 2 may be an example of any HMD 112 of FIG. 1A, FIG. 1B, FIG. 1C, and/or FIG. 1D. HMD 112 may be part of an artificial reality system, such as artificial reality system 100, or may operate as a stand-alone, mobile artificial realty system configured to implement the techniques described herein. HMD 112 may include a mobile device (e.g., a smart phone) that is removable from the body of the HMD 112.

In the example of FIG. 2, HMD 112 includes a front rigid body and a band to secure HMD 112 to a user. In addition, HMD 112 includes an interior-facing electronic display 203 configured to present artificial reality content to the user. Electronic display 203 may be any suitable display technology, such as liquid crystal displays (LCD), quantum dot display, dot matrix displays, light emitting diode (LED) displays, organic light-emitting diode (OLED) displays, cathode ray tube (CRT) displays, e-ink, or monochrome, color, or any other type of display capable of generating visual output. In some examples, the electronic display is a stereoscopic display for providing separate images to each eye of the user. In some examples, the known orientation and position of display 203 relative to the front rigid body of HMD 112 is used as a frame of reference, also referred to as a local origin, when tracking the position and orientation of HMD 112 for rendering artificial reality content according to a current viewing perspective of HMD 112 and the user.

In the example of FIG. 2, HMD 112 further includes one or more sensors 206, such as one or more accelerometers (also referred to as inertial measurement units or "IMUs") that output data indicative of current acceleration of HMD 112, GPS sensors that output data indicative of a location of HMD 112, radar or sonar sensors that output data indicative of distances of the HMD 112 from various objects, or other sensors that provide indications of a location or orientation of HMD 112 or other objects within a physical 3D environment. Moreover, HMD 112 may include one or more integrated sensor devices 208, such as a microphone, audio sensor, a video camera, laser scanner, Doppler radar scanner, depth scanner, or the like, configured to output audio or image data representative of a surrounding real-world environment. HMD 112 includes an internal control unit 210, which may include an internal power source and one or more printed-circuit boards having one or more processors, memory, and hardware to provide an operating environment for executing programmable operations to process sensed data and present artificial-reality content on display 203. Internal control unit 210 may be part of a removable computing device, such as a smart phone.

Although illustrated in FIG. 2 having a specific configuration and structure, HMD 112 may take any of a number of forms. For example, in some implementations, HMD 112 might resemble glasses or may have a different form. Also, although HMD 112 may be configured with a display 203 for presenting representations or images of physical content, in other examples, HMD 112 may include a transparent or partially transparent viewing lens, enabling see-through artificial reality (i.e., "STAR"). Further, HMD may implement features based on wave guides or other STAR technologies.

In accordance with the techniques described herein, control unit 210 is configured to present content within the context of a physical environment that may include one or more trigger objects. For example, HMD 112 may compute, based on sensed data generated by motion sensors 206 and/or audio and image data captured by sensor devices 208, a current pose for a frame of reference of HMD 112. Control unit 210 may include a pose tracking unit, which can execute software for processing the sensed data and/or images to compute the current pose. Control unit 210 may store a master 3D map for a physical environment and compare processed images to the master 3D map to compute the current pose. Alternatively, or additionally, control unit 210 may compute the current pose based on sensor data generated by sensors 206. Based on the computed current pose, control unit 210 may render artificial reality content corresponding to the master 3D map for an artificial reality application, and control unit 210 may display the artificial reality content via the electronic display 203.

As another example, control unit 210 may generate mapping information for the physical 3D environment in which the HMD 112 is operating and send, to a console or one or more other computing devices (such as one or more other HMDs), via a wired or wireless communication session(s), the mapping information. In this way, HMD 112 may contribute mapping information for collaborate generation of the master 3D map for the physical 3D environment. Mapping information may include images captured by sensor devices 208, tracking information in the form of indications of the computed local poses, or tracking information that provide indications of a location or orientation of HMD 112 within a physical 3D environment (such as sensor data generated by sensors 206), for example.

In some examples, in accordance with the techniques described herein, control unit 210 may peer with one or more controllers for HMD 112 (controllers not shown in FIG. 2). Control unit 210 may receive sensor data from the controllers that provides indications of user inputs or controller orientations or locations within the physical 3D environment or relative to HMD 112. Control unit 210 may send representations of the sensor data to a console for processing by the artificial reality application, where the indications may be event data for an artificial reality application. Control unit 210 may execute the artificial reality application to process the sensor data.

Figure 3:
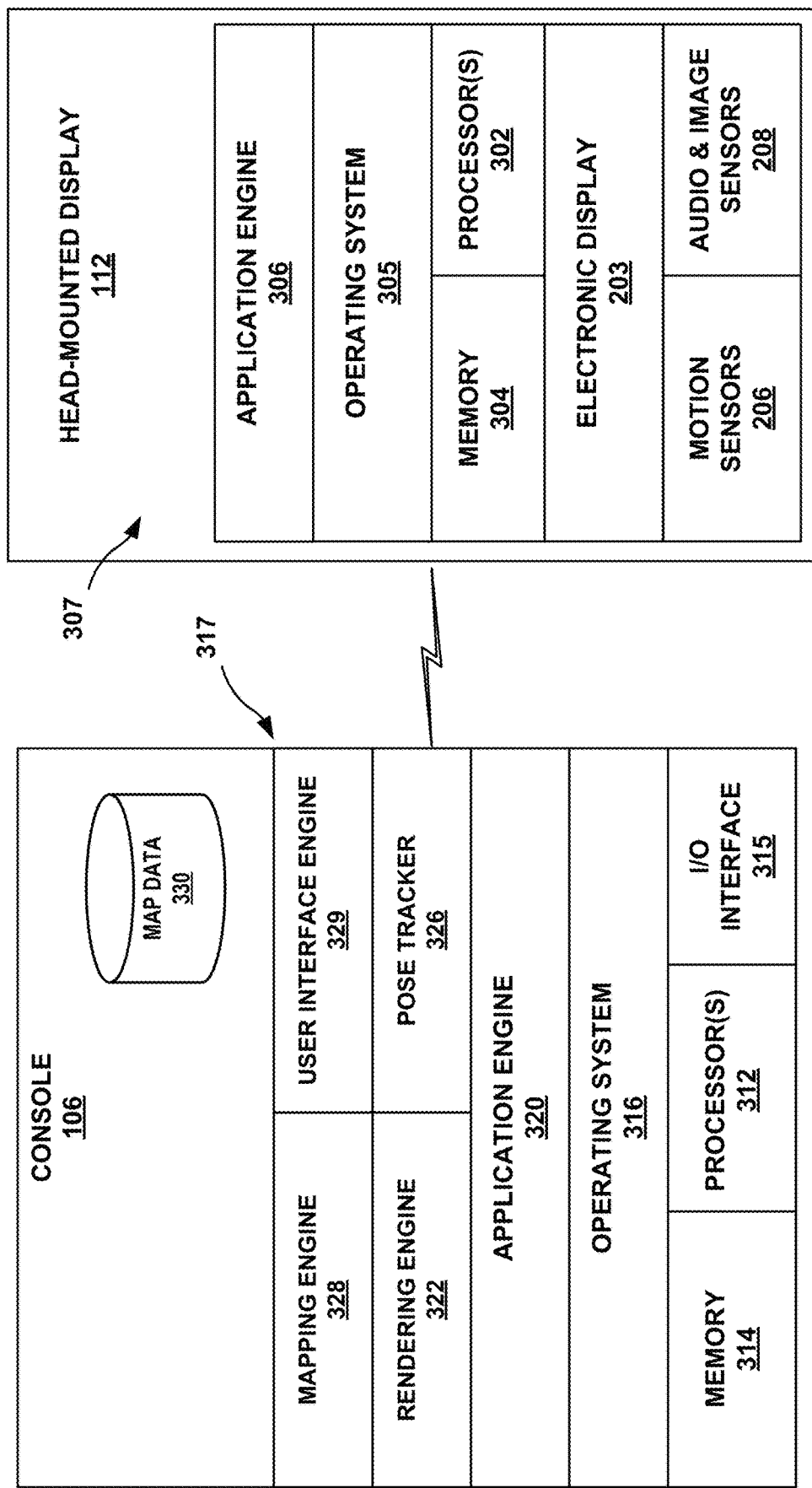
FIG. 3 is a block diagram showing example implementations of an example console and an example HMD, in accordance with one or more aspects of the present disclosure.

FIG. 3 is a block diagram showing example implementations of an example console and an example HMD, in accordance with one or more aspects of the present disclosure. Although the block diagram illustrated in FIG. 3 is described with reference to HMD 112, in other examples, functions and/or operations attributed to HMD 112 may be performed by a different device or system, such as a user device as referenced in connection with FIG. 1A.

In the example of FIG. 3, HMD 112 includes one or more processors 302 and memory 304 that, in some examples, provide a computer platform for executing an operation system 305, which may be an embedded and near (or seemingly-near) real-time multitasking operating system. In turn, operating system 305 provides a multitasking operating environment for executing one or more software components 307. Processors 302 are coupled to electronic display 203 (see FIG. 2). HMD 112 is shown including motion sensors 206 and sensor devices 208 coupled to processor 302, but in other examples, HMD 112 may include neither or merely either of motion sensors 206 and/or sensor devices 208. In some examples, processors 302 and memory 304 may be separate, discrete components. In other examples, memory 304 may be on-chip memory collocated with processors 302 within a single integrated circuit. The memory 304, processors 302, operating system 305, and application engine 340 components may collectively represent an example of internal control unit 210 of FIG. 2.

HMD 112 may include user input devices, such as a touchscreen or other presence-sensitive screen example of electronic display 203, microphone, controllers, buttons, keyboard, and so forth. Application engine 340 may generate and present a login interface via electronic display 203. A user of HMD 112 may use the user interface devices to input, using the login interface, login information for the user. HMD 112 may send the login information to console 106 to log the user into the artificial reality system.

Operating system 305 provides an operating environment for executing one or more software components, which include application engine 306, which may be implemented as any type of appropriate module. Application engine 306 may be an artificial reality application having one or more processes. Application engine 306 may send, to console 106 as mapping information using an I/O interface (not shown in FIG. 3) via a network or other communication link, representations of sensor data generated by motion sensors 206 or images generated by sensor devices 208. The artificial reality application may be, e.g., a teleconference application, a gaming application, a navigation application, an educational application, or training or simulation application, for example.

Console 106 may be implemented by any suitable computing system capable of interfacing with user devices (e.g., HMDs 112) of an artificial reality system. In some examples, console 106 interfaces with HMDs 112 to augment content that may be within physical environment 120, or to present artificial reality content triggered by an action or gesture performed in a particular location relative to a trigger object. In some examples, console 106 generates, based at least on mapping information received from one or more HMDs 112, external sensors 190, and/or cameras 192, a master 3D map of a physical 3D environment in which users, physical devices, and other physical objects are located. In some examples, console 106 is a single computing device, such as a workstation, a desktop computer, a laptop. In some examples, at least a portion of console 106, such as processors 352 and/or memory 354, may be distributed across one or more computing devices, a cloud computing system, a data center, or across a network, such as the Internet, another public or private communications network, for instance, broadband, cellular, Wi-Fi, and/or other types of communication networks, for transmitting data between computing systems, servers, and computing devices.

In the example of FIG. 3, console 106 includes one or more processors 312 and memory 314 that provide a computer platform for executing an operating system 316. In turn, operating system 316 provides an operating environment for executing one or more software components 317. Processors 312 are coupled to I/O interface 315, which provides one or more I/O interfaces for communicating with external devices, such as a keyboard, game controllers, display devices, image capture devices, and the like. Moreover, I/O interface 315 may include one or more wired or wireless network interface cards (NICs) for communicating with a network, such as network 104 (see, e.g., FIG. 1A). Each of processors 302, 312 may comprise any one or more of a multi-core processor, a controller, a digital signal processor (DSP), an application specific integrated circuit (ASIC), a field-programmable gate array (FPGA), or equivalent discrete or integrated logic circuitry. Memory 304, 314 may comprise any form of memory for storing data and executable software instructions, such as random-access memory (RAM), read-only memory (ROM), programmable read-only memory (PROM), erasable programmable read-only memory (EPROM), electronically erasable programmable read-only memory (EEPROM), and/or Flash memory. Software components 317 of console 106 operate to provide an overall artificial reality application. In the example of FIG. 3, software components 317 be represented by modules as described herein, including application engine 320, rendering engine 322, pose tracker 326, mapping engine 328, and user interface engine 329.

Application engine 320 includes functionality to provide and present an artificial reality application, e.g., a teleconference application, a gaming application, a navigation application, an educational application, training or simulation applications, and the like. Application engine 320 and application engine 340 may cooperatively provide and present the artificial reality application in some examples. Application engine 320 may include, for example, one or more software packages, software libraries, hardware drivers, and/or Application Program Interfaces (APIs) for implementing an artificial reality application on console 106. Responsive to control by application engine 320, rendering engine 322 generates 3D artificial reality content for display to the user by application engine 340 of HMD 112.

Rendering engine 322 renders the artificial content constructed by application engine 320 for display to user 101 in accordance with current pose information for a frame of reference, typically a viewing perspective of HMD 112, as determined by pose tracker 326. Based on the current viewing perspective, rendering engine 322 constructs the 3D, artificial reality content which may be overlaid, at least in part, upon the physical 3D environment in which HMD 112 is located. During this process, pose tracker 326 may operate on sensed data received from HMD 112, such as movement information and user commands, and, in some examples, data from external sensors 190 and/or cameras 192 (as shown in FIG. 1A, FIG. 1B, and FIG. 1C) to capture 3D information within the physical 3D environment, such as motion by HMD 112, a user thereof, a controller, and/or feature tracking information with respect to the user thereof.

Pose tracker 326 determines information relating to a pose of a user within a physical environment. For example, console 106 may receive mapping information from HMD 112, and mapping engine 328 may progressively generate a map for an area in which HMD 112 is operating over time, HMD 112 moves about the area. Pose tracker 326 may localize HMD 112, using any of the aforementioned methods, to the map for the area. Pose tracker 326 may also attempt to localize HMD 112 to other maps generated using mapping information from other user devices. At some point, pose tracker 326 may compute the local pose for HMD 112 to be in an area of the physical 3D environment that is described by a map generated using mapping information received from a different user device. Using mapping information received from HMD 112 located and oriented at the computed local pose, mapping engine 328 may join the map for the area generated using mapping information for HMD 112 to the map for the area generated using mapping information for the different user device to close the loop and generate a combined map for the master 3D map. Mapping engine 328 stores such information as map data 330. Based sensed data collected by external sensors 190, cameras 192, HMD 112, or other sources, pose tracker 326 determines a current pose for the frame of reference of HMD 112 and, in accordance with the current pose, provides such information to application engine 320 for generation of artificial reality content. That artificial reality content may then be communicated to HMD 112 for display to the user via electronic display 203.

Mapping engine 328 may be configured to generate maps of a physical 3D environment using mapping information received from user devices. Mapping engine 328 may receive the mapping information in the form of images captured by sensor devices 208 at local poses of HMD 112 and/or tracking information for HMD 112, for example. Mapping engine 328 processes the images to identify map points for determining topographies of the scenes in the images and use the map points to generate map data that is descriptive of an area of the physical 3D environment in which HMD 112 is operating. Map data 330 may include at least one master 3D map of the physical 3D environment that represents a current best map, as determined by mapping engine 328 using the mapping information.

Mapping engine 328 may receive images from multiple different user devices operating in different areas of a physical 3D environment and generate different maps for the different areas. The different maps may be disjoint in that the maps do not, in some cases, overlap to describe any of the same areas of the physical 3D environment. However, the different maps may nevertheless be different areas of the master 3D map for the overall physical 3D environment.

Pose tracker 326 determines information relating to a pose of a user within a physical environment. For example, console 106 may receive mapping information from HMD 112, and mapping engine 328 may progressively generate a map for an area in which HMD 112 is operating over time, HMD 112 moves about the area. Pose tracker 326 may localize HMD 112, using any of the aforementioned methods, to the map for the area. Pose tracker 326 may also attempt to localize HMD 112 to other maps generated using mapping information from other user devices. At some point, pose tracker 326 may compute the local pose for HMD 112 to be in an area of the physical 3D environment that is described by a map generated using mapping information received from a different user device. Using mapping information received from HMD 112 located and oriented at the computed local pose, mapping engine 328 may join the map for the area generated using mapping information for HMD 112 to the map for the area generated using mapping information for the different user device to close the loop and generate a combined map for the master 3D map. Mapping engine 328 stores that maps as map data 330. Based sensed data collected by external sensors 190, cameras 192, HMD 112, or other sources, pose tracker 326 determines a current pose for the frame of reference of HMD 112 and, in accordance with the current pose, provides such information to application engine 320 for generation of artificial reality content. That artificial reality content may then be communicated to HMD 112 for display to the user via electronic display 203.

Mapping engine 328 may use mapping information received from HMD 112 to update the master 3D map, which may be included in map data 330. Mapping engine 328 may, in some examples, determine whether the mapping information is preferable to previous mapping information used to generate the master 3D map. For example, mapping engine 328 may determine the mapping information is more recent in time, of higher resolution or otherwise better quality, indicates more or different types of objects, has been generated by a user device having higher resolution localization abilities (e.g., better inertial measurement unit or navigation system) or better optics or greater processing power, or is otherwise preferable. If preferable, mapping engine 328 generates an updated master 3D map from the mapping information received from HMD 112. Mapping engine 328 in this way progressively improves the master 3D map.

In some examples, mapping engine 328 may generate and store health data in association with different map data of the master 3D map. For example, some map data may be stale in that the mapping information used to generate the map data was received over an amount of time ago, or the map data may be of poor quality in that the images used to the generate the map data were poor quality (e.g., poor resolution, poor lighting, etc.). These characteristics of the map data may be associated with relatively poor health. Contrariwise, high quality mapping information would be associated with relatively good health. Health values for map data may be indicated using a score, a descriptor (e.g., "good", "ok", "poor"), a date generated, or other indicator. In some cases, mapping engine 328 may update map data of the master 3D map for an area if the health for the map data satisfies a threshold health value (e.g., is below a certain score). If the threshold health value is satisfied, mapping engine 328 generates an updated area for the area of the master 3D map using the mapping information received from HMD 112 operating in the area. Otherwise, mapping engine 328 discards the mapping information.

In some examples, map data 330 includes different master 3D maps for different areas of a physical 3D environment. Pose tracker 326 may localize HMD 112 to a location in one of the areas using images received from HMD 112. In response, application engine 320 may select the master 3D map for the area within which pose tracker 326 localized HMD 112 and send the master 3D map to HMD 112 for use in the artificial reality application. Consequently, HMD 112 may generate and render artificial reality content using the appropriate master 3D map for the area in which HMD 112 is located.

In some examples, map data includes different master 3D maps for the same area of a physical 3D environment, the different master 3D maps representing different states of the physical environment. For example, a first master 3D map may describe an area at a first time e.g., August 2015, while a second master 3D map may describe the area at a second time, e.g., October 2016. Application engine 320 may determine to use the first master 3D map responsive to a request from the user or responsive to a trigger within an artificial reality application, for instance. The mapping engine 328 may indicate in map data 330 that the first master 3D map is the master 3D map that is to be used for rendering artificial reality content for an artificial reality application. In this way, an artificial reality system including console 106 can render artificial reality content using historical map data describing a physical 3D environment as it appeared in earlier times. This technique may be advantageous for education-related artificial reality applications, for instance.

User interface engine 329 may perform functions relating to generating a user interface when a user is interacting or has interacted with a trigger object (e.g., seat 110) and/or when a user performs a gesture or action (e.g., sitting on seat 110). User interface engine 329 may receive information from application engine 320, pose tracker 326, and/or mapping engine 328 and based on that information, generate a user interface (e.g., user interface menu 124 having user interface elements 126). User interface engine 329 may output, to rendering engine 322, information about the user interface so that rendering engine 322 may present the user interface, overlaid on other physical and/or artificial reality content, at display 203 of HMD 112. Accordingly, user interface engine 329 may receive information from and output information to one or more other modules, and may otherwise interact with and/or operate in conjunction with one or more other engines or modules of console 106.

In some examples, such as in the manner described in connection with FIG. 4, some or all of the functionality attributed to pose tracker 326, rendering engine 322, configuration interface 332, classifier 324, and application engine 320 may be performed by HMD 112.

Figure 4:
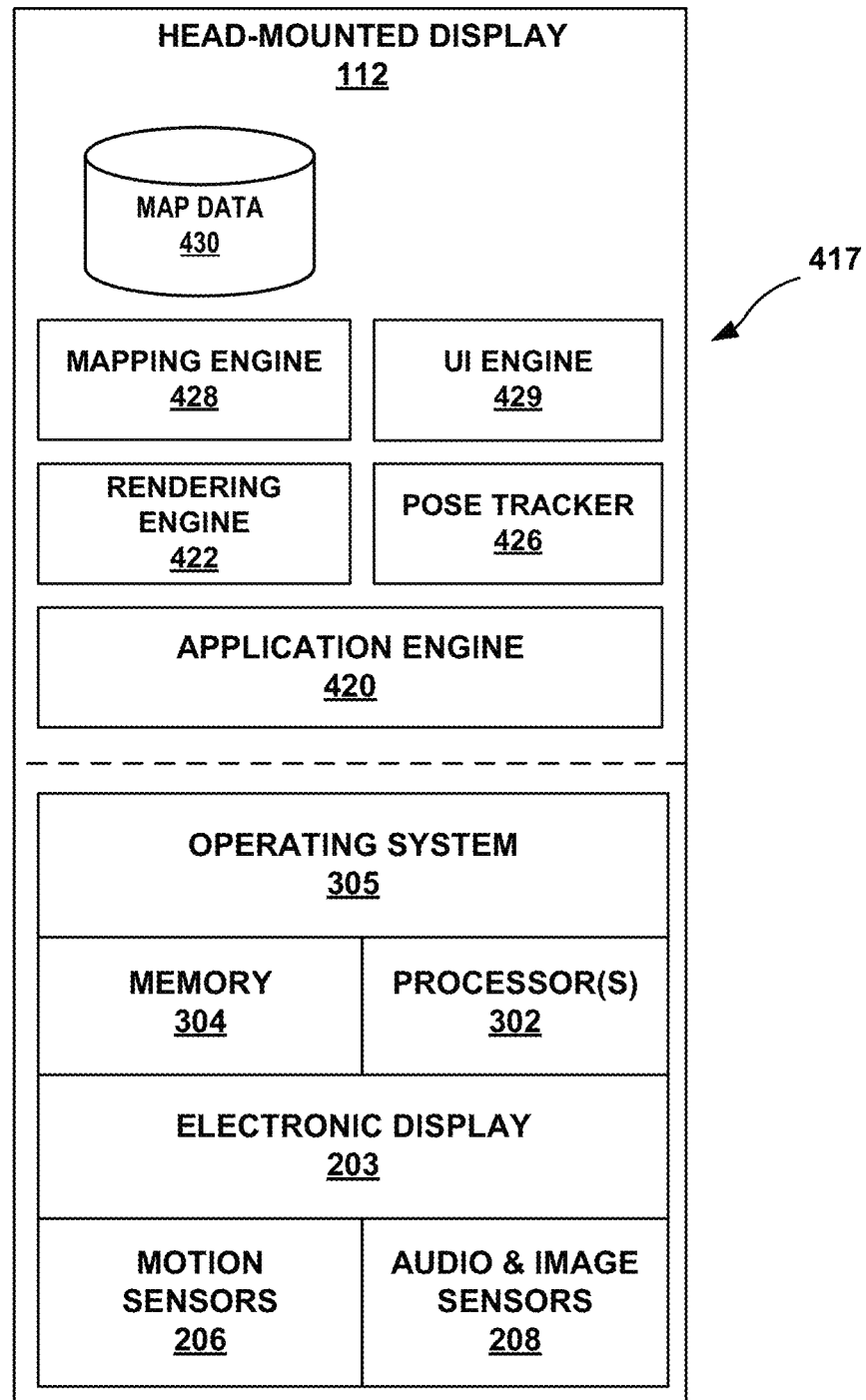
FIG. 4 is a block diagram depicting an example of a user device for an artificial reality system, in accordance with one or more aspects of the present disclosure.

Modules or engines illustrated in FIG. 3 (e.g., operating system 316, application engine 320, rendering engine 322, pose tracker 326, mapping engine 328, user interface engine 329, operating system 305, and application engine 306), FIG. 4, and/or illustrated or described elsewhere in this disclosure may perform operations described using software, hardware, firmware, or a mixture of hardware, software, and firmware residing in and/or executing at one or more computing devices. For example, a computing device may execute one or more of such modules with multiple processors or multiple devices. A computing device may execute one or more of such modules as a virtual machine executing on underlying hardware. One or more of such modules may execute as one or more services of an operating system or computing platform. One or more of such modules may execute as one or more executable programs at an application layer of a computing platform. In other examples, functionality provided by a module could be implemented by a dedicated hardware device.

Although certain modules, data stores, components, programs, executables, data items, functional units, and/or other items included within one or more storage devices may be illustrated separately, one or more of such items could be combined and operate as a single module, component, program, executable, data item, or functional unit. For example, one or more modules or data stores may be combined or partially combined so that they operate or provide functionality as a single module. Further, one or more modules may interact with and/or operate in conjunction with one another so that, for example, one module acts as a service or an extension of another module. Also, each module, data store, component, program, executable, data item, functional unit, or other item illustrated within a storage device may include multiple components, sub-components, modules, sub-modules, data stores, and/or other components or modules or data stores not illustrated.

Further, each module, data store, component, program, executable, data item, functional unit, or other item illustrated within a storage device may be implemented in various ways. For example, each module, data store, component, program, executable, data item, functional unit, or other item illustrated within a storage device may be implemented as a downloadable or pre-installed application or "app." In other examples, each module, data store, component, program, executable, data item, functional unit, or other item illustrated within a storage device may be implemented as part of an operating system executed on a computing device.

FIG. 4 is a block diagram depicting an example of a user device for an artificial reality system, in accordance with one or more aspects of the present disclosure. In FIG. 4, HMD 112 may operate as a stand-alone device, i.e., not tethered to a console, and may represent an instance of any of the user devices, including HMDs 112 described in connection with FIG. 1A, FIG. 1B, FIG. 1C, and FIG. 1D. Although device 112 illustrated in FIG. 4 is primarily described as a head-mounted device, the device illustrated in FIG. 4 may, in other examples, be implemented as a different device, such as tablet computer, for instance. In the specific example of FIG. 4, however, and in a manner similar to FIG. 3, HMD 112 includes one or more processors 302 and memory 304 that, in some examples, provide a computer platform for executing an operation system 305, which may be an embedded multitasking operating system. In turn, operating system 305 provides an operating environment for executing one or more software components 417. Moreover, processor(s) 302 are coupled to electronic display 203, motion sensors 206, and sensor devices 208.

In the example of FIG. 4, software components 417 operate to provide an overall artificial reality application. In this example, software components 417 include application engine 420, rendering engine 422, pose tracker 426, mapping engine 428, and user interface (UI) engine 429. In various examples, software components 417 operate similar to the counterpart components of console 106 of FIG. 3 (e.g., application engine 320, rendering engine 322, pose tracker 326, mapping engine 328, and user interface engine 329).

One or more aspects of FIG. 4 may be described herein within the context of other Figures, including FIG. 1A, FIG. 1B, FIG. 1C, and FIG. 1D. In various examples, HMD 112 may generate map information, determine a pose, detect input, identify one or more trigger objects, determine a user has performed a trigger action and de-trigger action with respect to an object, and present artificial reality content.

In accordance with one or more aspects of the present disclosure, HMD 112 of FIG. 1A and FIG. 4 may generate map information. For instance, in an example that can be described with reference to FIG. 1A and FIG. 4, each of external sensors 190, cameras 192, sensor devices 208 collect information about physical environment 120. External sensors 190 and cameras 192 communicate the information each collects to HMD 112, and such information may be communicated to HMD 112 over network 104 or through other means. HMD 112 receives information from external sensors 190 and/or cameras 192 and outputs to mapping engine 428 information about physical environment 120. Sensor devices 208 of HMD 112 also collect information about physical environment 120, and output to mapping engine 428 information about physical environment 120. Mapping engine 428 determines, based on the information received from external sensors 190, cameras 192, and/or sensor devices 208, a map of physical environment 120. Mapping engine 428 stores information about the map as map data 430.

HMD 112 may determine pose information. For instance, referring again to FIG. 1A and FIG. 4, motion sensor 206 and/or sensor devices 208 detect information about the position, orientation, and/or location of HMD 112. Pose tracker 426 receives from mapping engine 428 information about the position, orientation, and/or location of HMD 112. Pose tracker 426 determines, based on this information, a current pose for a frame of reference of HMD 112.

HMD 112 may identify one or more objects within physical environment 120 as trigger objects. For instance, continuing with the example and with reference to FIG. 1A and FIG. 4, mapping engine 428 identifies, based on the information received from external sensors 190, cameras 192, and/or sensor devices 208, one or more physical objects having the form of a chair, bench, desk, table, floor surface (e.g., a rug), or other object. Mapping engine 428 outputs information to application engine 420. Application engine 420 determines that one or more of the identified objects is to be considered a trigger object. For instance, in some examples, application engine 420 may be previously configured (e.g., by an administrator or through default settings) to treat any type of object capable of supporting user 101 in a seated position as a trigger object. In such an example, application engine 420 may store information in map data 430 identifying seat 110 of FIG. 1A as a trigger object. In some examples, application engine 420 might only recognize certain types of seats 110 as trigger objects, such as an object having the form of a bench as illustrated in FIG. 1A. In other examples, however, application engine 420 may alternatively or in addition recognize as a trigger object other types of objects that support users in a sitting position, such as couches, or chairs with a backrest, chairs with arm rests, and/or chairs that recline. Application engine 420 updates map data 430 to reflect the objects identified as trigger objects.

In some examples, HMD 112 and/or an artificial reality system in general may identify (whether automatically or in response to user input or otherwise) trigger objects that might be considered, in some senses, to be arbitrary and/or ordinary physical objects. Examples of such arbitrary or ordinary physical objects may include a chair or a table or a decorative item hanging on a wall, and might not, in some examples, encompass certain objects are part of an artificial reality system, such as a joystick or a controller or a device that might regularly communicate with other components (e.g., console 106) of an artificial reality system.

HMD 112 may identify one or more trigger objects within physical environment 120 in response to user input. In some examples, HMD 112 may identify trigger objects automatically, such as based on appearance, images of objects, and/or prior configurations, as described above. In other examples, however, HMD 112 may identify trigger objects identified by user 101 (or another user, such as an administrator). For instance, in such an example, and still referring to FIG. 1A and FIG. 4, external sensors 190, cameras 192, and/or sensor devices 208 detect movements by user 101 and output information about the movements to pose tracker 426. Pose tracker 426 determines that the movements correspond to a gesture performed by user 101. Pose tracker 426 outputs information about the gesture to application engine 420. Application engine 420 determines that the gesture corresponds to user 101 identifying seat 110 as a trigger object. In some examples, user 101 may point to seat 110 and perform a gesture that application engine 420 recognizes as user 101 identifying seat 110 as a trigger object. In other examples, user interface engine 429 may, in response to the gesture, cause a user interface to be presented within HMD 112A prompting user 101 for identification of one or more trigger objects. In some examples, HMD 112A may detect an object, and prompt user 101 to configure the detected object as a trigger object or to confirm or deny its use as a trigger object.

Further, in some examples, one or more user interfaces may present a set of configuration options when a trigger object is configured. Such configuration options may include defining a trigger action to be associated with an object (sitting on the object, standing on the object, touching the object, moving the object, picking up the object, throwing the object) or configuring responses to such actions (starting or resuming a game, a driving, flight, or other simulator, initiating communications with other users or systems).

HMD 112 may determine that user 101 is within physical environment 120 but is not sitting on seat 110. For instance, again in an example that can be described with reference to FIG. 1A and FIG. 4, mapping engine 428 outputs, to application engine 420, information about mapping information for physical environment 120. Pose tracker 426 outputs, to application engine 420, information about the current pose determined for a frame of reference of HMD 112. Application engine 420 determines, based on the mapping and pose information, that user 101 is standing near seat 110, but is not sitting on seat 110.

HMD 112 may present artificial reality content within HMD 112 while user 101 is standing. For instance, in FIG. 1A and with reference to FIG. 4, application engine 420 generates artificial reality content 122A. Application engine 420 outputs information about artificial reality content 122A to rendering engine 422. Rendering engine 422 causes artificial reality content 122A to be presented at display 203 within HMD 112 in the manner shown in FIG. 1A.

In FIG. 1A, artificial reality content 122A may correspond to simply an image of physical environment 120, with little or no artificial reality content overlaid on physical environment 120. In the example shown, artificial reality content 122A includes window 108, which is an image of window 108 illustrated in physical environment 120. Artificial reality content 122A also includes lamp 107 and picture 109, both of which are three-dimensional objects within physical environment 120 (in FIG. 1A, lamp 107 and picture 109 are positioned along the same wall as window 108, but are not included in the illustration of physical environment 120). Artificial reality content 122A of FIG. 1A is illustrated as an example of content that might be presented within HMD 112, generally only showing images or three-dimensional representations of objects in physical environment 120. In other examples, however, artificial reality content 122A may include artificial reality content, including artificial reality content overlaid on images of physical objects within physical environment 120. In at least some examples, physical objects are rendered from any angle to look three-dimensional.

HMD 112 may determine that user 101 has performed a trigger action with respect to seat 110. For instance, continuing with the example being described and with reference to FIG. 1B and FIG. 4, motion sensors 206 detect motion and sensor devices 208 capture images. Motion sensors 206 and sensor devices 208 output information about the detected motion and captured images to pose tracker 426. Pose tracker 426 determines a current pose of user 101. Pose tracker 426 outputs, to application engine 420, information about the current pose determined for a frame of reference of HMD 112. Mapping engine 428 outputs, to application engine 420, information about current mapping information for physical environment 120. Application engine 420 determines, based on the mapping and pose information, that user 101 has moved so that user 101 is sitting on seat 110, as illustrated in FIG. 1B. Application engine 420 determines that the movement performed by user 101 (i.e., sitting on seat 110) qualifies as a trigger action.

HMD 112 may present artificial reality content within HMD 112 in response to the trigger action. For instance, with reference to FIG. 1B and FIG. 4, application engine 420 determines, based on information about the trigger action and mapping information about seat 110, that artificial reality content relating to a driving scene should be presented. Application engine 420 generates artificial reality content 122B. Application engine 420 outputs information about artificial reality content 122B to rendering engine 422. Rendering engine 422 causes artificial reality content 122B to presented at display 203 within 112 in the manner shown in FIG. 1B.

In the example of FIG. 1B, content corresponding to a driving scene is presented, such as for a game or other artificial reality application. In other examples, artificial reality content 122B may correspond to content rendered pursuant to other types of applications, including, but not limited to, a social interaction application, a video conferencing application, a movement instruction application, an alternative world application, a navigation application, an educational application, gaming application, training or simulation applications, augmented reality application, virtual reality application, or other type of applications that implement artificial reality.

Often, content presented in response to a trigger action will have some parity with the trigger action performed by user 101. For example, if a trigger action involves moving from a standing to a sitting position, user 101 may be presented with triggered content where user 101 is in a sitting position, as in FIG. 1B. Similarly, if a trigger action involves interactions with a table, artificial reality content or triggered content might be expected to include content where user 101 is using a table. If user 101 is running to perform a trigger action, the artificial reality content presented in response to such a trigger action might involve content consistent with the running action.

HMD 112 may continue to present artificial reality content 122B while user 101 is seated on seat 110. For instance, still referring to FIG. 1B and FIG. 4, motion sensors 206 detect motion and sensor devices 208 capture images while user 101 is seated on seat 110. Motion sensors 206 and sensor devices 208 output information about detected motion and images to pose tracker 426. Pose tracker 426 determines a current pose, and outputs information about the current pose to application engine 420. Mapping engine 428 may output, to application engine 420, information about current mapping information for physical environment 120. Application engine 420 generates updated artificial reality content 122B in response to movements by user 101, and in response to progression of the game or driving experience being presented in HMD 112 (e.g., the scenery changes as user 101 drives along virtual road 143).

HMD 112 may present a user interface menu in response to user input. For instance, now referring to FIG. 1C and FIG. 4, application engine 420 may determine that motion by user 101 or gestures performed by user 101 indicate that the user seeks to modify one or more options corresponding to the driving experience that user 101 is being presented with through HMD 112. In response to such a determination, application engine 420 outputs information to user interface engine 429. User interface engine 429 generates a user interface and outputs information about the user interface to application engine 420. Application engine 420 generates artificial reality content 122C. Application engine 420 outputs information about artificial reality content 122C to rendering engine 422. Rendering engine 422 causes artificial reality content 122C to be presented at display 203 within HMD 112 in the manner shown in FIG. 1C.

In FIG. 1C, artificial reality content 122C includes user interface menu 124, and artificial reality content 122C is similar to artificial reality content 122B with the addition of menu 124 overlaid on the artificial reality content 122B. Included within user interface menu 124 is one or more user interface elements 126.

HMD 112 may perform operations in response to interactions with user interface menu 124. For instance, referring again to FIG. 1C and FIG. 4, HMD 112 may detect movements by user 101 that application engine 420 determines corresponds to selection of one or more user interface elements 126 within user interface menu 124. Application engine 420 may, in response to such movements, perform one or more operations. In some examples, such operations may cause user interface engine 429 to generate further user interfaces or modify aspects of artificial reality content 122C. In such examples, application engine 420 updates artificial reality content, and causes rendering engine 422 to present the updated content to the user at display 203.

HMD 112 may determine that user 101 has performed a de-trigger action. For instance, in an example that can be described with reference to FIG. 1D and FIG. 4, motion sensors 206 detect motion and sensor devices 208 capture images. Motion sensors 206 and sensor devices 208 output information about the detected motion and captured images to pose tracker 426. Pose tracker 426 determines a current pose of user 101. Pose tracker 426 outputs, to application engine 420, information about the current pose determined for a frame of reference of HMD 112. Mapping engine 428 outputs, to application engine 420, information about current mapping information for physical environment 120. Application engine 420 determines, based on the mapping and pose information, that user 101 is standing near seat 110 and is no longer sitting on seat 110, as illustrated in FIG. 1D. Application engine 420 determines that the action performed by user 101 (i.e., standing up after sitting on seat 110) qualifies as a de-trigger action.

HMD 112 may cease presentation of triggered content in response to determining that user 101 has performed a de-trigger action. For instance, now referring to FIG. 1D and FIG. 4, application engine 420 determines, based on information about the de-trigger action, that artificial reality content relating to the driving scene (shown in FIG. 1B and FIG. 1C) should be no longer be presented. Application engine 420 generates artificial reality content 122D. Application engine 420 outputs information about artificial reality content 122D to rendering engine 422. Rendering engine 422 causes artificial reality content 122D to presented at display 203 within HMD 112 in the manner shown in FIG. 1D, thereby ceasing presentation of artificial reality content 122C.

In some examples, when ceasing presentation of artificial reality content 122C, artificial reality content 122D may be presented as simply an image of physical environment 120 without any content from artificial reality content 122C of FIG. 1C. In other examples, however, some indication of content or parts of content from artificial reality content 122C may continue to be presented in 122D, even after the de-trigger action is detected. As illustrated in FIG. 1D, for example, game score indicator 145 is included in artificial reality content 122D, which may indicate a score achieved by user 101 when the de-trigger action was detected. Even after the de-trigger action, game score indicator 145 may be presented within artificial reality content 122D indefinitely, or for a limited period of time, or until removed in response to user input. In some examples, the appearance of game score indicator 145 may be modified (e.g., drawn with a dotted line, as shown in FIG. 1D) when presented in artificial reality content 122D, thereby indicating that game score indicator 145 corresponds to content previously presented in artificial reality content 122C.

Figure 5A:
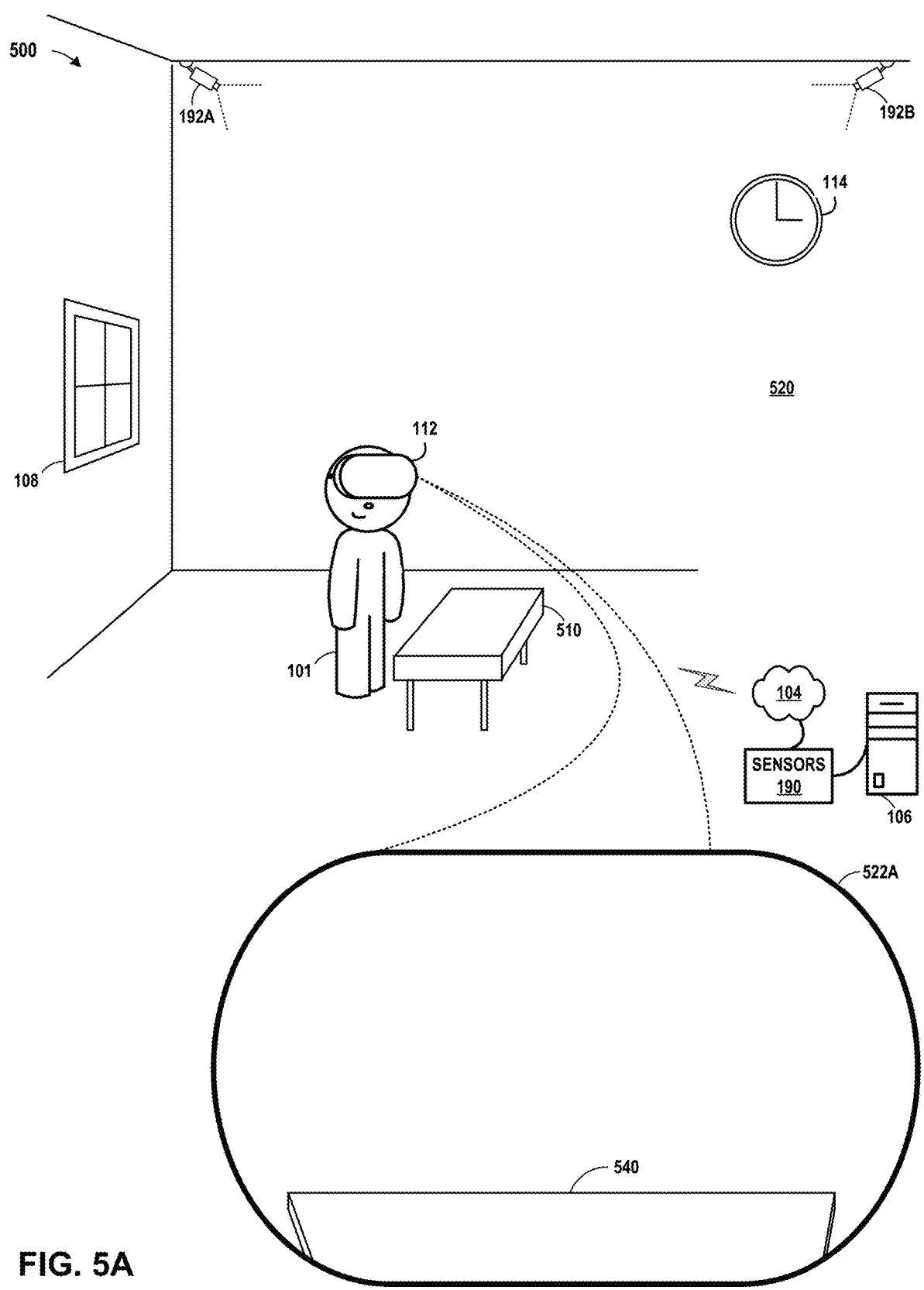
FIG. 5A, FIG. 5B, and FIG. 5C are conceptual diagrams illustrating an example artificial reality system that generates artificial reality content in response to interactions with a desk, in accordance with one or more aspects of the present disclosure.
Figure 5B:
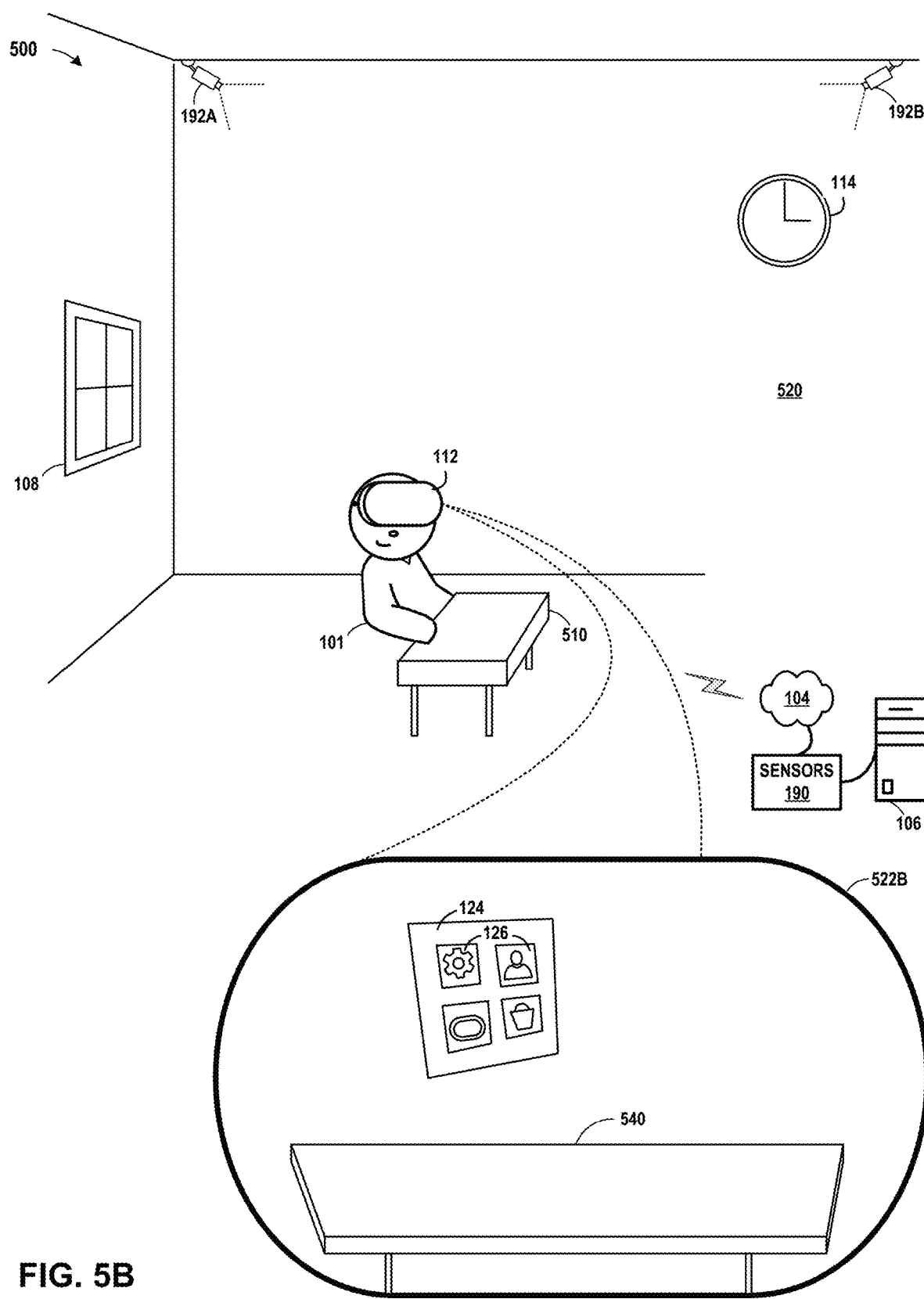
Figure 5C:
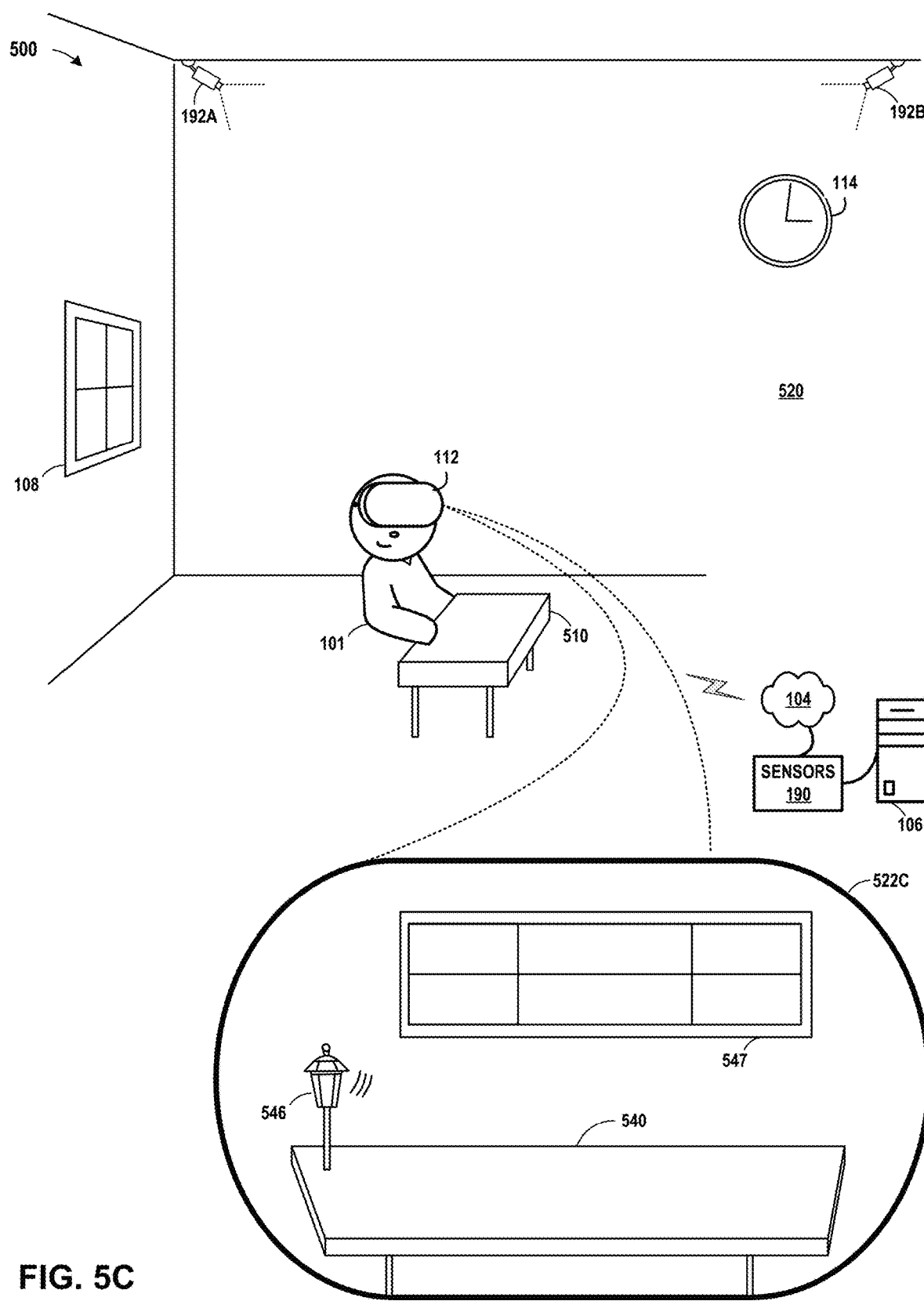

FIG. 5A, FIG. 5B, and FIG. 5C are conceptual diagrams illustrating an example artificial reality system that generates artificial reality content in response to interactions with a desk, in accordance with one or more aspects of the present disclosure. In each of FIG. 5A, FIG. 5B, and FIG. 5C, artificial reality system 500 is depicted within physical environment 520. Physical environment 520 is shown as a room that includes user 101 and a number of real world or physical objects, including HMD 112, window 108, desk 510, and wall clock 114.

In the examples of FIG. 5A, FIG. 5B, and FIG. 5C, artificial reality system 500 includes many of the same elements described in artificial reality system 100 of FIG. 1A (and other illustrations), and elements illustrated in each of FIG. 5A, FIG. 5B, and FIG. 5C may correspond to elements illustrated in FIG. 1A that are identified by like-numbered reference numerals in FIG. 1A. In general, such like-numbered elements may be implemented in a manner consistent with the description of the corresponding element provided in connection with FIG. 1A or elsewhere herein, although in some examples, such elements may involve alternative implementation with more, fewer, and/or different capabilities and attributes. Accordingly, artificial reality system 500 of FIG. 5A, FIG. 5B, and FIG. 5C may be described as an alternative example or implementation of artificial reality system 100 of FIG. 1A.

In accordance with one or more aspects of the present disclosure, HMD 112 may identify desk 510 as a trigger object. For instance, in an example that can be described with reference to FIG. 4 and FIG. 5A, mapping engine 428 identifies, based on information stored in map data 430, desk 510 as a trigger object, where an action is triggered when a user sits at desk 510 and, in some examples, places at least one arm on the surface of desk 510. In some examples, mapping engine 428 may be previously configured (e.g., by administrator) to identify desk 510 as such a trigger object. In other examples, however, mapping engine 428 may determine, in response to input from user 101, that desk 510 is to serve as a trigger object.

HMD 112 may present artificial reality content 522A while user 101 is standing near desk 510. For instance, referring again to FIG. 4 and FIG. 5A, application engine 420 determines, based on mapping and pose information, that user 101 is standing near seat 110. Application engine 420 generates artificial reality content 522A. Application engine 420 outputs information about artificial reality content 522A to rendering engine 422. Rendering engine 422 causes artificial reality content 522A to be presented at display 203 within HMD 112 in the manner shown in FIG. 5A. In FIG. 5A, artificial reality content 522A may present an image of physical environment 520, including virtual desk 540, derived from an image of desk 510 from the perspective of HMD 112.

HMD 112 may determine that user 101 has performed a trigger action on desk 510. For instance, referring now to FIG. 5B, motion sensors 206 and sensor devices 208 detect movements that application engine 420 determines corresponds to user 101 sitting at desk 510 and placing at least one arm on desk 510. Application engine 420 generates artificial reality content 522B. Application engine 420 outputs artificial reality content 522B to rendering engine 422, which causes artificial reality content 522B to be presented at display 203 within HMD 112, in the manner shown in FIG. 5B.

In FIG. 5B, artificial reality content 522B includes user interface menu 124 and virtual desk 540. User interface menu 124 includes one or more user interface elements 126, which provide options for which type of artificial reality experience is to be presented to the user. In some examples, virtual desk 540 presented in artificial reality content 522B might simply be an image of desk 510 from physical environment 520, without any artificial reality content overlaid on the image.

HMD 112 may present artificial reality content 522C based on interactions with artificial reality content 522B. For instance, referring now to FIG. 5B and FIG. 5C, motion sensors 206 and sensor devices 208 detect movements that application engine 420 determines correspond interactions with user interface menu 124 of FIG. 5B. Application engine 420 determines that the interactions correspond to a user's selection of an artificial reality experience to be presented in response to the trigger action (i.e., sitting at desk 510). Application engine 420 generates, based on the selection, artificial reality content 522C. Application engine 420 outputs artificial reality content 522C to rendering engine 422, which causes artificial reality content 522C to be presented at display 203 within HMD 112 in the manner illustrated in FIG. 5C.

In FIG. 5C, artificial reality content 522C includes virtual desk 540, virtual desk lamp 546, and virtual window 547. Artificial reality content 522C may alter the lighting presented within physical environment 520, such as through virtual desk lamp 546 providing additional light for virtual desk 540. Virtual window 547 may provide a specific view chosen by user 101 and/or otherwise selected for user 101. In some examples, artificial reality content 522C may be presented along with music chosen by user 101 or otherwise selected based on determined musical interests of user 101.

In at least some examples previously described in connection with FIG. 1A through FIG. 1D, artificial reality content is presented (e.g., automatically, without further user input) upon detecting a trigger action with respect to seat 110. That artificial reality content may be selected based on the identity of user 101, a user profile associated with user 101, time of day, day of week, a calendar maintained or used by user 101, or other time-based information. However, in the example just described with reference to FIG. 5A, FIG. 5B, and FIG. 5C, HMD 112 presents options for selecting artificial reality content upon detecting a trigger action with respect to desk 510. Artificial reality content is then presented based on interactions with a user interface (e.g., user interface menu 124) by user 101. Accordingly, in some examples, artificial reality content may be presented automatically upon detection of a trigger action. In other examples, options for artificial reality content may be presented to user 101 upon detection of a trigger action, and artificial reality content may then be presented in response to selected options.

Figure 6A:
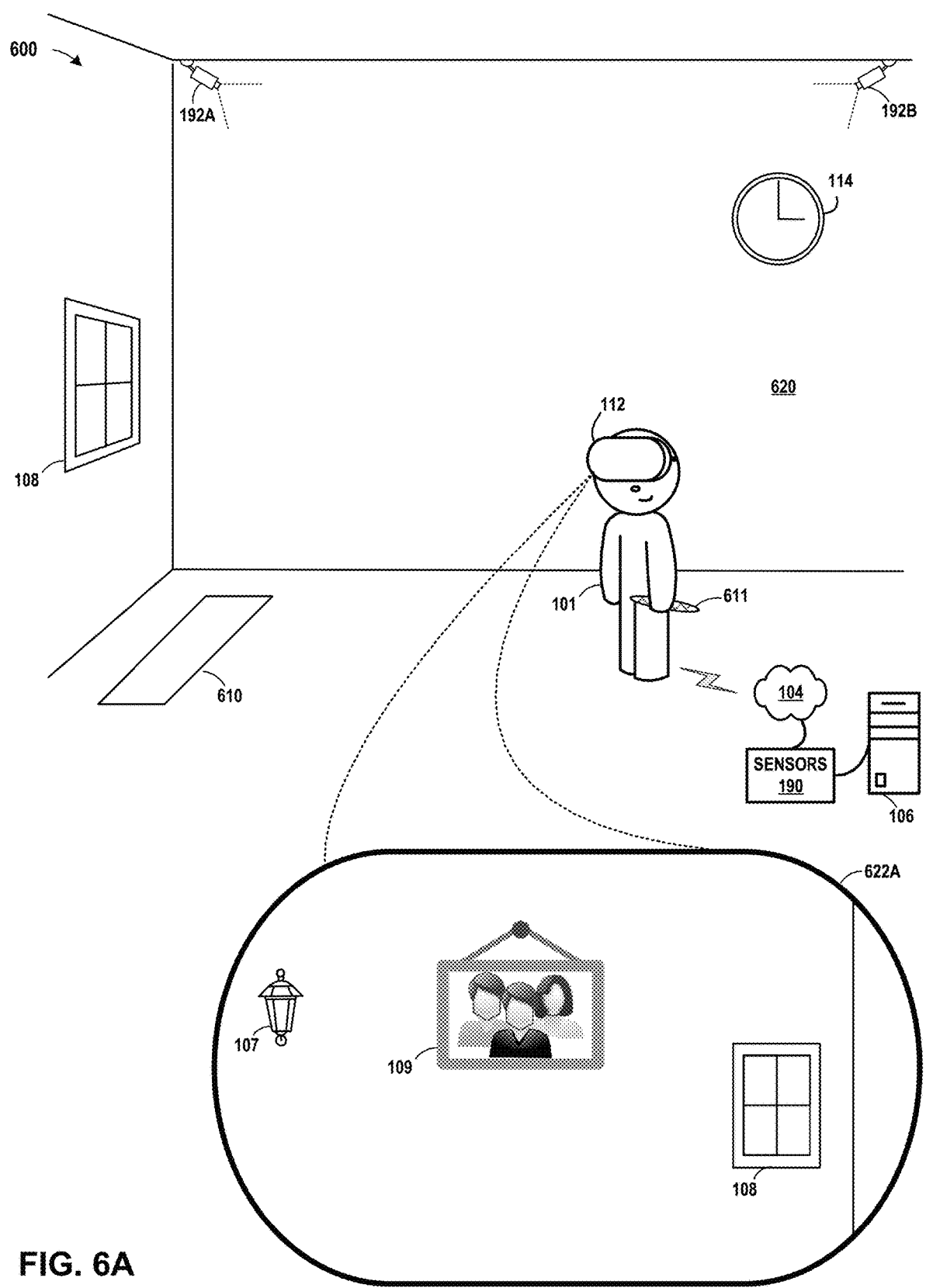
FIG. 6A and FIG. 6B are conceptual diagrams illustrating an example artificial reality system that generates artificial reality content in response to interactions with a portion of a floor space, in accordance with one or more aspects of the present disclosure.
Figure 6B:
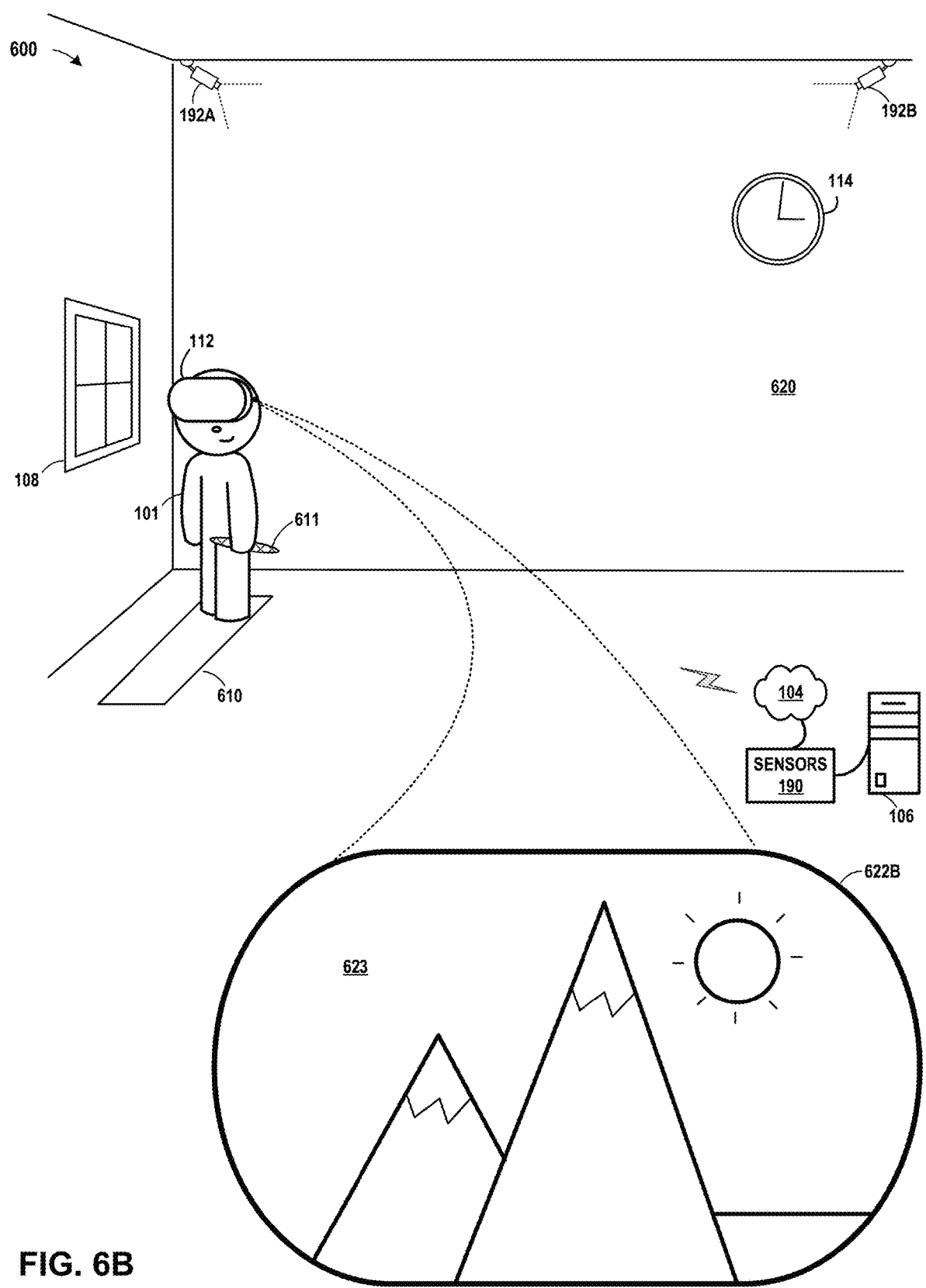

FIG. 6A and FIG. 6B are conceptual diagrams illustrating an example artificial reality system that generates artificial reality content in response to interactions with a portion of a floor space, in accordance with one or more aspects of the present disclosure. In each of FIG. 6A and FIG. 6B, artificial reality system 600 is depicted within physical environment 620. Physical environment 620 is shown as a room that includes user 101 and a number of real world or physical objects, including HMD 112, window 108, rug 610 and wall clock 114. In addition, artificial reality system 600 includes context object 611, which is held by user 101. Context object 611 may be an object that is used to select or help select a particular artificial reality experience presented upon detection of a trigger action, as described herein.

In the examples of FIG. 6A and FIG. 6B, artificial reality system 600 includes many of the same elements described in artificial reality system 100 of FIG. 1A, and elements illustrated in FIG. 6A and FIG. 6B may correspond to elements illustrated in FIG. 1A that are identified by like-numbered reference numerals in FIG. 1A. In general, such like-numbered elements may be implemented in a manner consistent with the description of the corresponding element provided in connection with FIG. 1A or elsewhere herein, although in some examples, such elements may involve alternative implementation with more, fewer, and/or different capabilities and attributes. Accordingly, artificial reality system 600 of FIG. 6A and FIG. 6B may again be described as an alternative example or implementation of artificial reality system 100 of FIG. 1A.

In accordance with one or more aspects of the present disclosure, HMD 112 may identify rug 610 and context object 611. For instance, in an example that can be described with reference to FIG. 4 and FIG. 6A, mapping engine 428 identifies, based on information stored in map data 430, rug 610 as a trigger object. Mapping engine 428 further identifies, based on information stored in map data 430, context object 611 as an object that is used to select what type of artificial reality content is presented upon interaction with rug 610.

HMD 112 may present artificial reality content 622A while user 101 is not standing on rug 610. For instance, still referring to FIG. 6A, application engine 420 determines, based on mapping and pose information, that user 101 is standing within physical environment 620, but at a location not on rug 610. Application engine 420 generates artificial reality content 622A. Application engine 420 outputs 622A to rendering engine 422. Rendering engine 422 causes artificial reality content 622 to be presented at display 203 within HMD 112 in the manner shown in FIG. 6A.

In FIG. 6A, artificial reality content 622A presents an image of a wall within physical environment 620. Physical environment 620 includes a wall having lamp 107, window 108, and picture 109. In the illustration of FIG. 6A, window 108 is visible in physical environment 620. In artificial reality content 622A, an image of objects along that wall in physical environment 620 are illustrated, including lamp 107, window 108, and picture 109. In some examples, artificial reality content may be overlaid on the image of physical environment 620 presented within artificial reality content 622A, but in the example shown, only an image of physical environment 620 is presented.

HMD 112 may determine that user 101 has performed a trigger action on rug 610. For instance, referring now to FIG. 6B, motion sensors 206 and sensor device 208 detect movements that application engine 420 determines corresponds to user 101 walking over to rug 610 and standing on rug 610. Application engine 420 determines, based on information from motion sensors 206, sensor devices 208, and/or current mapping information from map data 430, that user 101 is holding context object 611 in a hand. Application engine 420 recognizes that user 101 standing on rug 610 corresponds to a trigger action being performed on rug 610. Application engine 420 generates artificial reality content 622B, and uses information about user 101 holding context object 611 to select content to include within artificial reality content 622B. Application engine 420 outputs artificial reality content 622B to rendering engine 422. Rendering engine 422 causes artificial reality content 622B to be presented at display 203 within HMD 112 in the manner illustrated in FIG. 6B.

In FIG. 6B, virtual vista 623 in artificial reality content 622B replaces the image of physical environment 620 presented in artificial reality content 622A. In some examples, virtual vista 623 may be a replica of a real place, perhaps a place user 101 has previously visited. In some examples, the place depicted in virtual vista 623 might have some correlation with context object 611, meaning, for example, that context object 611 is used to select virtual vista 623. For instance, in one example, context object 611 may be a souvenir user 101 purchased when visiting the place depicted in virtual vista 623. Application engine 420 may determine, based on prior input from user 101, an administrator, or through image recognition of context object 611, that context object 611 is associated in some way with the place depicted in virtual vista 623. Accordingly, in such an example, application engine 420 uses context object 611 to select virtual vista 623 to present to user 101 within HMD 112.

Figure 7:
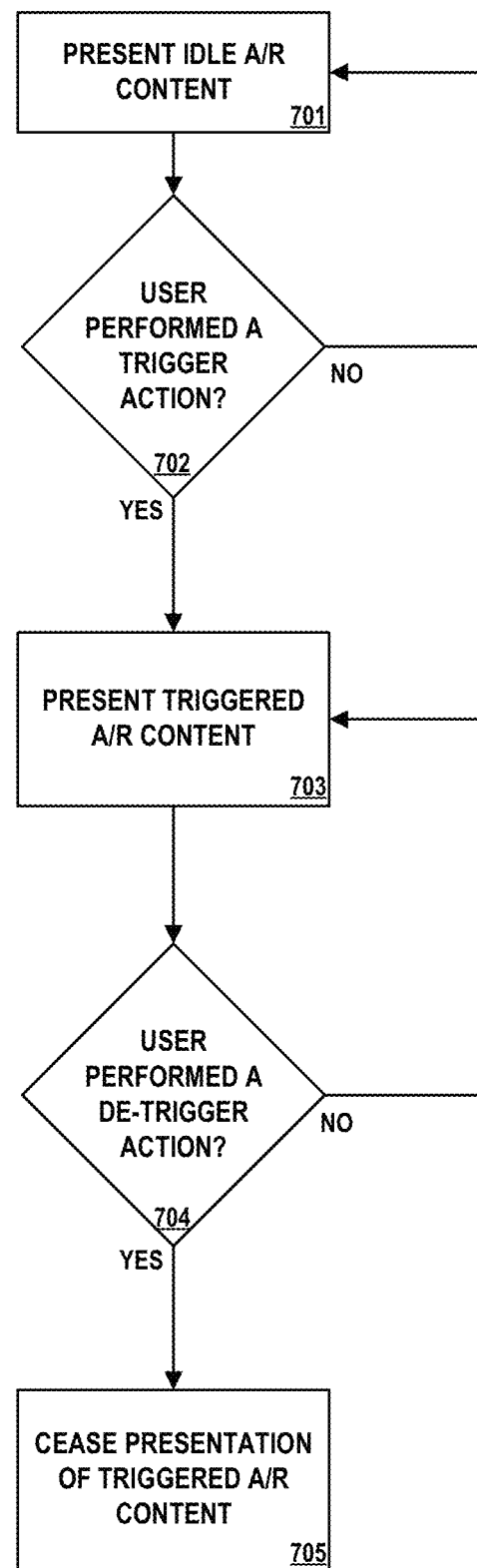
FIG. 7 is a flow diagram illustrating operations performed by an example artificial reality console in accordance with one or more aspects of the present disclosure.

FIG. 7 is a flow diagram illustrating operations performed by an example artificial reality console 106 in accordance with one or more aspects of the present disclosure. FIG. 7 is described below within the context of artificial reality system 100 of FIG. 1A through FIG. 1D. In other examples, operations described in FIG. 7 may be performed by one or more other components, modules, systems, or devices. Further, in other examples, operations described in connection with FIG. 7 may be merged, performed in a difference sequence, omitted, or may encompass additional operations not specifically illustrated or described.

In the process illustrated in FIG. 7, and in accordance with one or more aspects of the present disclosure, console 106 may cause idle artificial reality content to be presented within HMD 112 (701). For example, with reference to FIG. 1A, each of HMD 112, external sensors 190, and/or cameras 192 capture images within physical environment 120. Console 106 receives such images and determines the position of physical objects within physical environment 120, including user 101, HMD 112, and seat 110. Console 106 generates map data (e.g., map data 330 in FIG. 3) describing the physical environment. Console 106 identifies seat 110 as a trigger object, based on user input, image recognition, prior configuration, or in another way. Console 106 generates artificial reality content 122A and causes artificial reality content 122A to be presented within HMD 112. In some examples, artificial reality content 122A may be considered "idle" artificial reality content, since it might not be artificial reality content presented in response to a trigger action. Idle artificial reality content may be simply an image of physical environment 120, or may include artificial reality content overlaid on an image of physical environment 120.

Console 106 may determine whether user 101 has performed a trigger action (702). For example, with reference to FIG. 1B, console 106 and/or HMD 112 detect motion and capture images. Console 106 uses the detected motion and images to determine a pose of user 101. Console 106 uses the pose and/or mapping information to determine that user 101 is sitting on seat 110, as illustrated in FIG. 1B. Console 106 determines that the action performed by user 101 (e.g., sitting on seat 110) qualifies as a trigger action (YES path from 702). In examples where console 106 determines that user 101 is not sitting on seat 110, console 106 continues to present idle content (NO path from 702).

Console 106 may cause triggered artificial reality content to be presented within HMD 112 (703). For example, with reference to FIG. 1B, console 106 generates an artificial reality environment, including artificial reality content 122B reflecting a driving experience. Console 106 causes artificial reality content 122B to be presented within HMD 112. In the example of FIG. 1B, artificial reality content 122B may present an immersive driving experience that includes no physical elements from physical environment 120. In other examples, however, artificial reality content 122B may augment aspects of physical environment 120 with artificial reality content, rather than providing an immersive experience.

Console 106 may determine whether user 101 has performed a de-trigger action (704). For example, with reference to FIG. 1D, console 106 and/or 112 detect motion and capture images. Console 106 uses the detected motion and captured images to determine a pose of user 101. Console 106 determines that user 101 is standing after sitting on seat 110, and console 106 further determines that the motion of user 101 in standing qualifies as a de-trigger action.

Console 106 may cease presentation of the triggered artificial reality content (705). For example, again referring to FIG. 1D, console 106 generates artificial reality content 122D, which like artificial reality content 122A, includes an image of physical environment 120. Console 106 causes artificial reality content 122D to be presented within HMD 112. In some examples, artificial reality content 122D may be substantially similar to artificial reality content 122A, and may correspond to presenting the same type of "idle" content presented prior to detecting the trigger action. Accordingly, console 106 ceases presentation of artificial reality content 122C and replaces artificial reality content 122C with idle artificial reality content (e.g., 122D) upon detecting that user 101 is standing after sitting on seat 110.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

For ease of illustration, only a limited number of devices (e.g., HMD 112, console 106, external sensors 190, cameras 192, networks 104, as well as others) are shown within the Figures and/or in other illustrations referenced herein. However, techniques in accordance with one or more aspects of the present disclosure may be performed with many more of such systems, components, devices, modules, and/or other items, and collective references to such systems, components, devices, modules, and/or other items may represent any number of such systems, components, devices, modules, and/or other items.

The Figures included herein each illustrate at least one example implementation of an aspect of this disclosure. The scope of this disclosure is not, however, limited to such implementations. Accordingly, other example or alternative implementations of systems, methods or techniques described herein, beyond those illustrated in the Figures, may be appropriate in other instances. Such implementations may include a subset of the devices and/or components included in the Figures and/or may include additional devices and/or components not shown in the Figures.

The detailed description set forth above is intended as a description of various configurations and is not intended to represent the only configurations in which the concepts described herein may be practiced. The detailed description includes specific details for the purpose of providing a sufficient understanding of the various concepts. However, these concepts may be practiced without these specific details. In some instances, well-known structures and components are shown in block diagram form in the referenced figures in order to avoid obscuring such concepts.

Accordingly, although one or more implementations of various systems, devices, and/or components may be described with reference to specific Figures, such systems, devices, and/or components may be implemented in a number of different ways. For instance, one or more devices illustrated in the Figures herein (e.g., FIG. 1A, FIG. 1B, FIG. 1C, FIG. 1D, FIG. 2, and/or FIG. 3) as separate devices may alternatively be implemented as a single device; one or more components illustrated as separate components may alternatively be implemented as a single component. Also, in some examples, one or more devices illustrated in the Figures herein as a single device may alternatively be implemented as multiple devices; one or more components illustrated as a single component may alternatively be implemented as multiple components. Each of such multiple devices and/or components may be directly coupled via wired or wireless communication and/or remotely coupled via one or more networks. Also, one or more devices or components that may be illustrated in various Figures herein may alternatively be implemented as part of another device or component not shown in such Figures. In this and other ways, some of the functions described herein may be performed via distributed processing by two or more devices or components.

Further, certain operations, techniques, features, and/or functions may be described herein as being performed by specific components, devices, and/or modules. In other examples, such operations, techniques, features, and/or functions may be performed by different components, devices, or modules. Accordingly, some operations, techniques, features, and/or functions that may be described herein as being attributed to one or more components, devices, or modules may, in other examples, be attributed to other components, devices, and/or modules, even if not specifically described herein in such a manner.

Although specific advantages have been identified in connection with descriptions of some examples, various other examples may include some, none, or all of the enumerated advantages. Other advantages, technical or otherwise, may become apparent to one of ordinary skill in the art from the present disclosure. Further, although specific examples have been disclosed herein, aspects of this disclosure may be implemented using any number of techniques, whether currently known or not, and accordingly, the present disclosure is not limited to the examples specifically described and/or illustrated in this disclosure.

The techniques described in this disclosure may be implemented, at least in part, in hardware, software, firmware or any combination thereof. For example, various aspects of the described techniques may be implemented within one or more processors, including one or more microprocessors, DSPs, application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components or integrated within common or separate hardware or software components.

The techniques described in this disclosure may also be embodied or encoded in a computer-readable medium, such as a computer-readable storage medium, containing instructions. Instructions embedded or encoded in a computer-readable storage medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer readable media.

As described by way of various examples herein, the techniques of the disclosure may include or be implemented in conjunction with an artificial reality system. As described, artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some examples, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

What is claimed is:

1. A system comprising:
an image capture system configured to capture image data representative of a physical environment having a plurality of physical objects including a trigger object, the trigger object being capable of supporting a user in a sitting position;
a head-mounted display (HMD) worn by the user;
a mapping engine configured to determine, based on the image data, a map of the physical environment including the trigger object; and
an application engine configured to:
determine that the user has sat down on the trigger object, and
responsive to determining that the user has sat down on the trigger object, present an artificial reality environment on a display associated with the HMD, wherein to present the artificial reality environment, the application engine is further configured to identify the user and generate artificial reality content based on information about the user.

2. The system of claim 1, wherein the application engine is further configured to:
recognize a gesture made by the user designating one of the plurality of physical objects as the trigger object; and
store map data associated with the trigger object.

3. The system of claim 1, wherein the trigger object is a first trigger object, wherein the artificial reality environment is a first artificial reality environment, and wherein the application engine is further configured to:
determine that the user is performing a sitting motion on a second trigger object, and
responsive to determining that the user is performing a sitting motion on the second trigger object, present a second artificial reality environment on a display associated with the HMD.

4. The system of claim 1, wherein to identify the user, the application engine is further configured to:
identify the user based on biometric information detected by the HMD.

5. The system of claim 1, wherein to identify the user, the application engine is further configured to:
identify the user based on input detected by the HMD in response to a prompt presented by the HMD.

6. The system of claim 1, wherein the information about the user includes:
profile information associated with the user.

7. The system of claim 1, wherein the information about the user includes:
information based on an object possessed by the user.

8. The system of claim 1, wherein the information about the user includes:
information derived from a calendar maintained by the user.

9. The system of claim 1, wherein the application engine is further configured to:
determine that the user is no longer sitting on the trigger object; and
cease presentation of the artificial reality environment in response to determining that the user is no longer sitting on the trigger object.

10. The system of claim 1, wherein to present the artificial reality environment, the application engine is further configured to:
overlay artificial reality content on an image of the physical environment.

11. A method comprising:
capturing, by an artificial reality system, image data representative of a physical environment having a plurality of physical objects including a trigger object, the trigger object being capable of supporting a user in a sitting position;
determining, by the artificial reality system and based on the image data, a map of the physical environment including position information about the trigger object;
determining, by the artificial reality system, that the user is performing a sitting motion on the trigger object, and
responsive to determining that the user is performing a sitting motion on the trigger object, presenting, by the artificial reality system, an artificial reality environment on a display associated with a head-mounted display (HMD), wherein presenting the artificial reality environment includes identifying the user and generating artificial reality content based on information about the user.

12. The method of claim 11, further comprising:
recognizing, by the artificial reality system, a gesture made by the user designating one of the plurality of physical objects as the trigger object; and
storing, by the artificial reality system, map data associated with the trigger object.

13. The method of claim 11, wherein the trigger object is a first trigger object, wherein the artificial reality environment is a first artificial reality environment, and wherein the method further comprises:
determining, by the artificial reality system, that the user is performing a sitting motion on a second trigger object, and
responsive to determining that the user is performing a sitting motion on the second trigger object, presenting, by the artificial reality system, a second artificial reality environment on a display associated with the HMD.

14. The method of claim 11, wherein identifying the user includes:
identifying the user based on biometric information detected by the HMD.

15. The method of claim 11, wherein identifying the user includes:
identifying the user based on input detected by the HMD in response to a prompt presented by the HMD.

16. The method of claim 11, wherein the information about the user includes:
profile information associated with the user.

17. The method of claim 11, wherein the information about the user includes:
information based on an object possessed by the user.

18. A non-transitory computer-readable medium comprising instructions for causing processing circuitry of an artificial reality system to perform operations comprising:
capturing image data representative of a physical environment having a plurality of physical objects including a trigger object, the trigger object being capable of supporting a user in a sitting position;
determining, based on the image data, a map of the physical environment including position information about the trigger object;
determining that the user is performing a sitting motion on the trigger object, and
responsive to determining that the user is performing a sitting motion on the trigger object, presenting an artificial reality environment on a display associated with a head-mounted display, wherein presenting the artificial reality environment includes identifying the user and generating artificial reality content based on information about the user.

* * * * *